US011990260B2

(12) United States Patent
Ito et al.

(10) Patent No.: US 11,990,260 B2
(45) Date of Patent: May 21, 2024

(54) RARE EARTH MAGNET AND PRODUCTION METHOD THEREOF

(71) Applicants: TOYOTA JIDOSHA KABUSHIKI KAISHA, Toyota (JP); NICHIA CORPORATION, Anan (JP)

(72) Inventors: Masaaki Ito, Anjo (JP); Motoki Hiraoka, Toyota (JP); Reimi Tabuchi, Nisshin (JP); Hisashi Maehara, Itano-gun (JP); Masanori Okanan, Anan (JP)

(73) Assignees: TOYOTA JIDOSHA KABUSHIKI KAISHA, Toyota (JP); NICHIA CORPORATION, Anan (JP)

( * ) Notice: Subject to any disclaimer, the term of this patent is extended or adjusted under 35 U.S.C. 154(b) by 0 days.

(21) Appl. No.: 17/978,688

(22) Filed: Nov. 1, 2022

(65) Prior Publication Data

US 2023/0139716 A1 May 4, 2023

(30) Foreign Application Priority Data

Nov. 1, 2021 (JP) ................................ 2021-178979
Feb. 28, 2022 (JP) ................................ 2022-030024

(51) Int. Cl.
*H01F 1/059* (2006.01)
*C22C 38/00* (2006.01)

(52) U.S. Cl.
CPC ........... *H01F 1/059* (2013.01); *C22C 38/001* (2013.01); *C22C 38/005* (2013.01); *C22C 2202/02* (2013.01)

(58) Field of Classification Search
None
See application file for complete search history.

(56) References Cited

U.S. PATENT DOCUMENTS

2017/0186519 A1 6/2017 Maehara
2020/0098497 A1 * 3/2020 Sakuma ................ C22C 1/0433

FOREIGN PATENT DOCUMENTS

JP 2017-117937 A 6/2017
JP 2019012796 A * 1/2019
(Continued)

OTHER PUBLICATIONS

Machine translation of JP 2020-053440A. (Year: 2020).*
Machine translation of JP2019-012796A. (Year: 2019).*

*Primary Examiner* — Xiaowei Su
(74) *Attorney, Agent, or Firm* — Oliff PLC

(57) ABSTRACT

The present invention is a method for producing a rare earth magnet, including preparing a magnetic powder and a modifier powder, mixing them to obtain a mixed powder, compression-molding the mixed powder in a magnetic field to obtain a magnetic-field molded body, and pressure-sintering the magnetic-field molded body to obtain a sintered body, wherein the magnetic powder includes a first particle group and a second particle group, the $D_{50}$ values of the first particle group and the second particle group are denoted by $d_1$ μm and $d_2$ μm, respectively, $d_1$ and $d_2$ satisfy the relationship of $0.350 \leq d_2/d_1 \leq 0.500$, and the ratio between the total volume of the first particle group and the total volume of the second particle group is from 9:1 to 4:1; and a rare earth magnet obtained by the production method.

6 Claims, 6 Drawing Sheets

(56) References Cited

FOREIGN PATENT DOCUMENTS

| | | | | |
|---|---|---|---|---|
| JP | 2020053440 | A | * | 4/2020 |
| JP | 2020-102606 | A | | 7/2020 |
| WO | 2015/199096 | A1 | | 12/2015 |

* cited by examiner

RARE EARTH MAGNET AND PRODUCTION METHOD THEREOF

FIELD

The present disclosure relates to a production method of a rare earth magnet. More specifically, the present disclosure relates to a production method of a rare earth magnet having a magnetic phase which contains Sm, Fe and N and at least partially has a crystal structure of either $Th_2Zn_{17}$ type or $Th_2Ni_{17}$ type.

BACKGROUND

As a high-performance rare earth magnet, a Sm—Co-based rare earth magnet and a Nd—Fe—B-based rare earth magnet have been put into practical use, but recently, rare earth magnets other than these are studied.

For example, a rare earth magnet containing Sm, Fe and N (hereinafter, sometimes referred to as "Sm—Fe—N-based rare earth magnet") is being studied. The Sm—Fe—N-based rare earth magnet is manufactured, for example, using a magnetic powder containing Sm, Fe and N (hereinafter, sometimes referred to as "SmFeN powder").

The SmFeN powder has a magnetic phase having a crystal structure of either $Th_2Zn_{17}$ type or $Th_2Ni_{17}$ type. In this magnetic phase, N is considered as forming an interstitial solid solution in a Sm—Fe crystal. Consequently, N is likely to dissociate with heat to cause decomposition of the SmFeN powder. For this reason, the Sm—Fe—N-based rare earth magnet is often produced by molding a SmFeN powder with use of a resin and/or rubber, etc.

Other methods for producing a Sm—Fe—N-based rare earth magnet include, for example, a production method disclosed in Patent Literature 1. In this production method, a SmFeN powder and a powder containing metallic zinc (hereinafter, sometimes referred to as "metallic zinc powder") are mixed, the mixed powder is molded in a magnetic field, and the magnetic-field molded body is sintered (including liquid phase sintering).

The production method of a SmFeN powder is also disclosed, for example, in Patent Literatures 2 and 3.

CITATION LIST

Patent Literature

[PTL 1] International Publication WO 2015/199096 A1
[PTL 2] Japanese Unexamined Patent Publication JP 2017-117937 A
[PTL 3] Japanese Unexamined Patent Publication JP No. 2020-102606 A

SUMMARY

Technical Problem

The method for sintering the magnetic-field molded body is roughly divided into a pressureless sintering method and a pressure sintering method. In either sintering method, a high-density rare earth magnet, which is a sintered body, is obtained by sintering the magnetic-field molded body. In the pressureless sintering method, a pressure is not applied to the magnetic-field molded body during sintering, and therefore in order to obtain a high-density sintered body, the magnetic-field molded body is generally sintered at a high temperature of 900° C. or more for a long time of 6 hours or more. On the other hand, in the pressure sintering method, since a pressure is applied to the magnetic-field molded body during sintering, a high-density sintered body is generally obtained even when the magnetic-field molded body is sintered at a low temperature of 600 to 800° C. for a short time of 0.1 to 5 hours.

In the case of sintering a magnetic-field molded body of a mixed powder of SmFeN powder and metallic zinc powder, pressure sintering is employed so as to avoid decomposition of the SmFeN powder due to heat, and the sintering is performed at a lower sintering temperature for a shorter time than in the normal pressure sintering. The reason why sintering is possible even at such a low temperature and a short time is because the zinc component in the metallic zinc powder diffuses to the magnetic powder surface during sintering and sintered (solidified). In this way, the metallic zinc powder in the magnetic-field molded body has a function as a binder. In addition, the metallic zinc powder in the magnetic-field molded body also has a function as a modifier that modifies an αFe phase in the SmFeN powder, particularly on the SmFeN powder particle surface, and absorbs oxygen in the SmFeN powder to enhance the coercive force. Hereinafter, a powder having both a function as a binder and a function as a modifier, which is used at the time of production of a Sm—Fe—N-based rare earth magnet, is sometimes simply referred to as "modifier powder".

In both a case of molding the magnetic powder with use of a resin and/or rubber, etc. and a case of pressure-sintering a mixed powder of magnetic powder and modifier powder, the magnetization of the molded body (rare earth magnet) is reduced by the amount of content ratios of a resin and a modifier each having no contribution to magnetization. On the other hand, compared with the case of molding the magnetic powder with use of a resin and/or rubber, etc., in the case of pressure-sintering a mixed powder of magnetic powder and modifier powder, a high-density molded body (rare earth magnet) is generally obtained, as a result, high magnetization is likely to be obtained. However, in the case where the magnetic powder is a SmFeN powder, even when a mixed powder of magnetic powder and modifier powder is pressure-sintered, the magnetization is reduced more than expected from the content ratio of the modifier, and the desired magnetization is sometimes not obtained.

From these, the present inventors have discovered the problem that a production method of a Sm—Fe—N-based rare earth magnet, in which the magnetization can be more enhanced than ever before, is demanded.

The present disclosure has been made to solve the problem above. More specifically, an object of the present disclosure is to provide a production method of a Sm—Fe—N-based rare earth magnet, in which magnetization can be more enhanced than ever before.

Solution to Problem

The present inventors have made many intensive studies to attain the object above and have accomplished the production method of a rare earth magnet of the present disclosure. The production method of a rare earth magnet of the present disclosure includes the following embodiments.

<1> A production method of a rare earth magnet, including:

preparing a magnetic powder having a magnetic phase which contains Sm, Fe and N and at least partially has a crystal structure of either $Th_2Zn_{17}$ type or $Th_2Ni_{17}$ type, preparing a modifier powder containing at least either a metallic zinc or a zinc alloy, mixing the magnetic powder and the modifier powder to obtain a mixed powder, compression-molding the mixed powder in a magnetic field to obtain a magnetic-field molded body, and pressure-sintering the magnetic-field molded body to obtain a sintered body, wherein the magnetic powder includes a first particle group and a second particle group, the particle size distribution $D_{50}$ of the first particle group and the particle size distribution $D_{50}$ of the second particle group are denoted by $d_1$ μm and $d_2$ μm, respectively, $d_1$ and $d_2$ satisfy the relationship of $0.350 \leq d_2/d_1 \leq 0.500$, and the ratio between the total volume of the first particle group and the total volume of the second particle group which is the total volume of first particle group:total volume of second particle group, is from 9:1 to 4:1.

<2> The production method of a rare earth magnet according to item <1>, wherein $d_1$ is from 3.0 to 3.7 μm and $d_2$ is from 1.4 to 1.8 μm.

<3> The production method of a rare earth magnet according to item <1> or <2>, wherein $D_{50}$ of the modifier powder is from 0.1 to 12.0 μm and the content ratio of the zinc component in the modifier powder is from 1 to 30 mass % relative to the mixed powder.

<4> The production method of a rare earth magnet according to any one of items <1> to <3>, wherein the mixed powder is compression-molded at a pressure of 10 to 1,500 MPa.

<5> The production method of a rare earth magnet according to any one of items <1> to <4>, wherein the magnetic-field molded body is pressure-sintered at a pressure of 100 to 2,000 MPa and a temperature of 300 to 430° C. over 1 to 30 minutes.

<6> The production method of a rare earth magnet according to any one of items <1> to <5>, further including, before the pressure sintering, previously forming a modification-inhibiting coating on the particle surface of the second particle group, and heat-treating the sintered body to allow the progress of modification of the particle surface of the first particle group.

<7> The production method of a rare earth magnet according to item <6>, wherein the modification-inhibiting coating contains phosphoric acid.

<8> The production method of a rare earth magnet according to item <6> or <7>, wherein the sintered body is heat-treated at 350 to 410° C.

<9> A rare earth magnet that is a sintered body including:

a magnetic powder having a magnetic phase which contains Sm, Fe and N and at least partially has a crystal structure of either $Th_2Zn_{17}$ type or $Th_2Ni_{17}$ type, and a zinc component, wherein the magnetic powder includes a first particle group and a second particle group, the particle size distribution $D_{50}$ of the first particle group and the particle size distribution $D_{50}$ of the second particle group are denoted by $d_1$ μm and $d_2$ μm, respectively, $d_1$ and $d_2$ satisfy the relationship of $0.350 \leq d_2/d_1 \leq 0.500$, and the ratio between the total volume of the first particle group and the total volume of the second particle group, which is the total volume of first particle group:total volume of second particle group, is from 9:1 to 4:1.

Advantageous Effects of Invention

According to the manufacturing method of the present disclosure, the ratio of the particle diameter of the second particle to the particle diameter of the first particle group and the ratio between the total volume of the first particle group and the total volume of the second particle group are in predetermined ranges, and the density of the sintered body (rare earth magnet) can thereby be increased. Consequently, a production method of a rare earth magnet, in which the magnetization can be more enhanced than ever before, can be provided.

DESCRIPTION OF EMBODIMENTS

Embodiments of the production method of a rare earth magnet of the present disclosure (hereinafter, sometimes simply referred to as "the production method of the present disclosure") are described below. Incidentally, the embodiments described below should not be construed to limit the manufacturing method of the present disclosure.

Although not bound by theory, the reason why a rare earth magnet in which the magnetization is more enhanced than ever before is obtained by the production method of the present disclosure is described below using the drawings by comparison with the conventional production method of a rare earth magnet (hereinafter, sometimes simply referred to as "the conventional production method").

Figure 1:
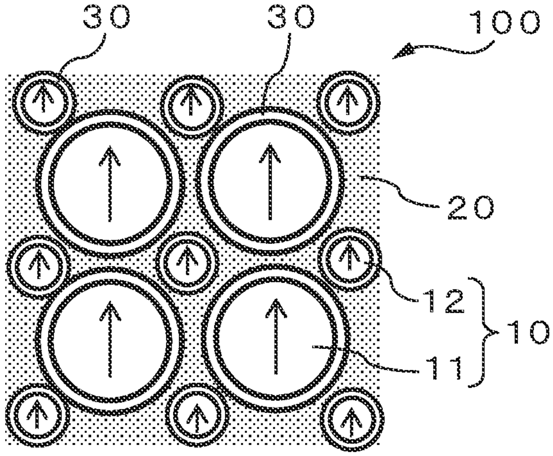
FIG. 1 is a schematic diagram illustrating one example of the microstructure of a rare earth magnet obtained by the production method of the present disclosure.
Figure 2:
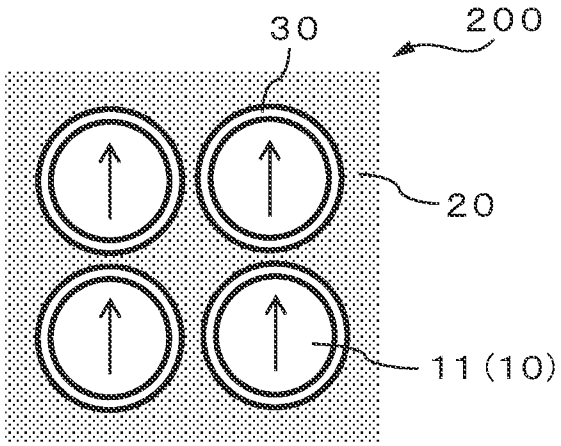
FIG. 2 is a schematic diagram illustrating one example of the microstructure of a rare earth magnet obtained by the conventional production method.
Figure 3:
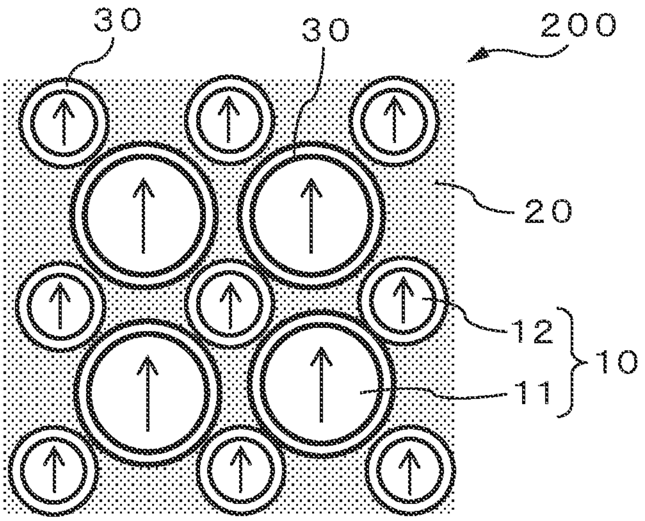
FIG. 3 is a schematic diagram illustrating another example of the microstructure of a rare earth magnet obtained by the conventional production method.
Figure 4:
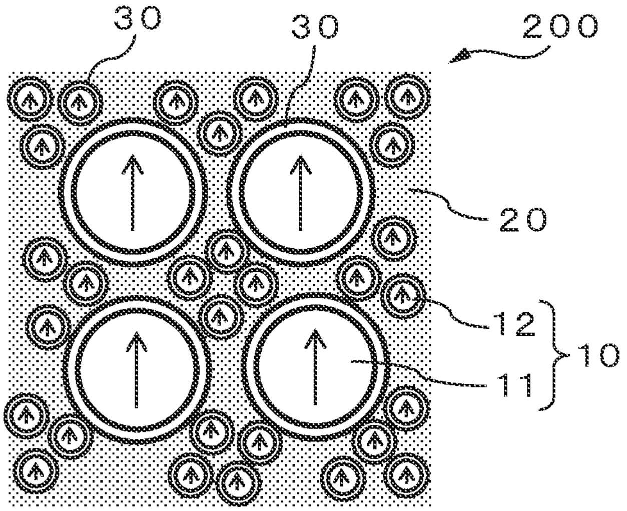
FIG. 4 is a schematic diagram illustrating still another example of the microstructure of a rare earth magnet obtained by the conventional production method.

FIG. 1 is a schematic diagram illustrating one example of the microstructure of a rare earth magnet obtained by the production method of the present disclosure. FIG. 2 is a schematic diagram illustrating one example of the microstructure of a rare earth magnet obtained by the conventional production method. FIG. 3 is a schematic diagram illustrating another example of the microstructure of a rare earth magnet obtained by the conventional production method. FIG. 4 is a schematic diagram illustrating still another example of the microstructure of a rare earth magnet obtained by the conventional production method. Here, in FIGS. 1 to 4, the arrow indicates the magnetic orientation direction.

As illustrated in FIG. 1, in the rare earth magnet 100 obtained by the production method of the present disclosure, SmFeN powder particles 10 are bound by a modifier 20. This is because, as described above, the modifier 20 has a function as a binder. The surface of the SmFeN powder particles 10 is covered with a modified phase 30.

As illustrated in FIG. 1, in the rare earth magnet 100 obtained by the production method of the present disclosure, the SmFeN powder particles 10 include a first particle group 11 having a large particle diameter and a second particle group 12 having a small particle diameter. Each particle of the second particle group 12 is present between respective particles of the first particle group 11, and the density of the rare earth magnet 100 can thereby be increased. Consequently, the magnetization is enhanced. For example, as illustrated in FIG. 2, in one example of the rare earth magnet 200 obtained by the conventional production method, the SmFeN powder particles 10 are substantially only the first particle group 11, and therefore the density of the rare earth magnet 200 cannot be increased, as a result, the magnetization is not enhanced.

Also, as illustrated in FIG. 1, the density of the rare earth magnet 100 obtained by the production method of the present disclosure can be increased only when the ratio of the particle diameter of the second particle group 12 to the particle diameter of the first particle group 11 is in a predetermined range. For example, as illustrated in FIG. 3, in another example of the rare earth magnet 200 obtained by the conventional production method, the ratio of the particle diameter of the second particle group 12 to the particle diameter of the first particle group 11 is too large, and therefore the distance between respective particles of the first particle group 11 increases. In turn, the density of the rare earth magnet 200 obtained by the conventional production method cannot be increased, as a result, the magnetization is not enhanced.

In addition, in order to increase the density of the rare earth magnet 100 obtained by the production method of the present disclosure, it is necessary that not only the ratio of the particle diameter of the second particle group 12 to the particle diameter of the first particle group 11 is in a predetermined range but also the ratio between the total volume of the first particle group 11 and the total volume of the second particle group 12 is in a predetermined range. Because, when particles of the second particle group 12 are present at or above a certain degree, as illustrated in FIG. 1, the distance between respective particles of the first particle group 11 is sufficiently filled, whereas if particles of the second particle group 12 are present in excess, as illustrated in FIG. 4, the distance between respective particles of the first particle group 11 increases. Due to this increase, the density of the rare earth magnet 200 obtained by the conventional production method cannot be increased, as a result, the magnetization is not enhanced.

Furthermore, compared with large-diameter SmFeN powder particles like the first particle group 11, the small-diameter SmFeN powder particles like the second particle group 12 have a small particle residual magnetization σr. This is because the crystal structure of the particle surface has been deteriorated and since the specific surface area of small-diameter particles is large compared with large-diameter particles, small-diameter particles like the second particle group 12 readily deteriorate in their particle residual magnetization σr. The excessive presence of such a second particle group 12 leads to a reduction in the magnetization of the entire rare earth magnet.

For these reasons, in the production method of the present disclosure, a reduction in the magnetization is avoided by avoiding excessive presence of particles of the second particle group 12.

Although not bound by theory, as described above, with respect to the first particle group 11 and the second particle group 12, it is considered that for the following reason, both the ratio between particle diameters and the ratio between total volumes need to be in predetermined ranges. This is considered necessary because compared with a magnetic powder, etc. used for the production of a Nd—Fe—B-based rare earth magnet, the friction coefficient of the SmFeN powder particles is very large, and therefore the SmFeN powder does not exhibit good flowability at the time of molding, making it difficult to increase the filling factor of a molded body (rare earth magnet). Incidentally, the residual magnetization is represented by the following formula, which makes it understandable that when the density is increased, the magnetization is enhanced.

Residual magnetization=saturated magnetization×degree of orientation×(density/true density)×magnetic phase ratio The constituent features of the production method of the present disclosure accomplished based on the knowledge discussed hereinabove are described below.

<<Production Method>>

The production method of the present disclosure includes a magnetic powder preparation step, a modifier powder preparation step, a mixing step, a magnetic-field molding step, and a pressure sintering step. Also, the production method of the present disclosure optionally includes a modification-inhibiting coating formation step and a heat treatment step. Each step is described below.

<Magnetic Powder Preparation Step>

A magnetic powder (SmFeN powder) is prepared. The magnetic powder (SmFeN powder) for use in the production method of the present disclosure is not particularly limited as long as it has a magnetic phase containing Sm, Fe and N and at least partially having a crystal structure of either $Th_2Zn_{17}$ type or $Th_2Ni_{17}$ type. The crystal structure of the magnetic phase includes a phase having a $TbCu_7$-type crystal structure, etc., in addition to the above-described structures. Note that Sm is samarium, Fe is iron, and N is nitrogen. Also, Th is thorium, Zn is zinc, Ni is nickel, Tb is terbium, and Cu is copper.

The SmFeN powder may include, for example, a magnetic phase represented by composition formula $(Sm_{(1-i)}R_i)_2(Fe_{(1-j)}Co_j)_{17}N_h$. The rare earth magnet (hereinafter, sometimes referred to as a "product") obtained by the manufacturing method of the present disclosure develops magnetization derived from the magnetic phase in the SmFeN powder. Here, i, j, and h denote the molar ratios.

The magnetic phase in the SmFeN powder may contain R within a range not impairing the effects of the production method of the present disclosure and the magnetic properties of the product. This range is represented by i in the composition formula above. The term i may be, for example, 0 or more, 0.10 or more, or 0.20 or more, and may be 0.50 or less, 0.40 or less, or 0.30 or less. R is one or more selected from rare earth elements other than Sm, and Zr. In the present description, the rare earth elements are Sc, Y, La, Ce, Pr, Nd, Pm, Sm, Eu, Gd, Tb, Dy, Ho, Er, Tm, Yb, and Lu. Incidentally, Zr is zirconium, Sc is scandium, Y is yttrium, La is lanthanum, Ce is cerium, Pr is praseodymium, Nd is neodymium, Pm is promethium, Sm is samarium, Eu is europium, Gd is gadolinium, Tb is terbium, Dy is dysprosium, Ho is holmium, Er is erbium, Tm is thulium, Yb is ytterbium, and Lu is lutetium.

With respect to $(Sm_{(1-i)}R_i)_2(Fe_{(1-j)}Co_j)_{17}N_h$, typically, R is substituted at the position of Sm in $Sm_2(Fe_{(1-j)}Co_j)_{17}N_h$, but the configuration is not limited thereto. For example, part of R may be interstitially disposed in $Sm_2(Fe_{(1-j)}Co_j)_{17}N_h$.

The magnetic phase in the SmFeN powder may contain Co within a range not impairing the effects of the production method of the present disclosure and the magnetic properties of the product. This range is represented by j in the composition formula above. The term j may be 0 or more, 0.10 or more, or 0.20 or more, and may be 0.52 or less, 0.40 or less, or 0.30 or less.

With respect to $(Sm_{(1-i)}R_i)_2(Fe_{(1-j)}Co_j)_{17}N_h$, typically, Co is substituted at the position of Fe of $(Sm_{(1-i)}R_i)_2Fe_{17}N_h$, but the configuration is not limited thereto. For example, part of Co may be interstitially disposed in $(Sm_{(1-i)}R_i)_2Fe_{17}N_h$.

N interstitially exists in the crystal grain represented by $(Sm_{(1-i)}R_i)_2(Fe_{(1-j)}Co_j)_{17}$, and the magnetic phase in the SmFeN powder thereby contributes to the development and enhancement of the magnetic properties.

With respect to $(Sm_{(1-i)}R_i)_2(Fe_{(1-j)}Co_j)_{17}N_h$, h may be from 1.5 to 4.5, but typically, the configuration is $(Sm_{(1-i)}R_i)_2(Fe_{(1-j)}Co_j)_{17}N_3$. h may be 1.8 or more, 2.0 or more, or 2.5 or more, and may be 4.2 or less, 4.0 or less, or 3.5 or less. The content of $(Sm_{(1-i)}R_i)_2(Fe_{(1-j)}Co_j)_{17}N_3$ relative to the entire $(Sm_{(1-i)}R_i)_2(Fe_{(1-j)}Co_j)_{17}N_h$ is preferably 70 mass % or more, more preferably 80 mass % or more, still more preferably 90 mass %. On the other hand, $(Sm_{(1-i)}R_i)_2(Fe_{(1-j)}Co_j)_{17}N_h$ need not entirely be $(Sm_{(1-i)}R_i)_2(Fe_{(1-j)}Co_j)_{17}N_3$. The content of $(Sm_{(1-i)}R_i)_2(Fe_{(1-j)}Co_j)_{17}N_3$ relative to the entire $(Sm_{(1-i)}R_i)_2(Fe_{(1-j)}Co_j)_{17}N_h$ may be 98 mass % or less, 95 mass % or less, or 92 mass % or less.

The SmFeN powder may contain, in addition to the magnetic phase represented by $(Sm_{(1-i)}R_i)_2(Fe_{(1-j)}Co_j)_{17}N_h$, oxygen and $M^1$ as well as unavoidable impurity elements within a range substantially not impairing the effects of the manufacturing method of the present disclosure and the magnetic properties of the product. From the viewpoint of ensuring the magnetic properties of the product, the content of the magnetic phase represented by $(Sm_{(1-i)}R_i)_2(Fe_{(1-j)}Co_j)_{17}N_h$ relative to the entire SmFeN powder may be 80 mass % or more, 85 mass % or more, or 90 mass % or more. On the other hand, even when the content of the magnetic phase represented by $(Sm_{(1-i)}R_i)_2(Fe_{(1-j)}Co_j)_{17}N_h$ relative to the entire SmFeN powder is not excessively high, there is practically no problem. Accordingly, the content may be 97 mass % or less, 95 mass % or less, or 93 mass % or less. The remainder of the magnetic phase represented by $(Sm_{(1-i)}R_i)_2(Fe_{(1-j)}Co_j)_{17}N_h$ corresponds to the content of oxygen and $M^1$. Also, part of oxygen and M 1 may be interstitially and/or substitutionally present in the magnetic phase.

$M^1$ is one or more selected from Ga, Ti, Cr, Zn, Mn, V, Mo, W, Si, Re, Cu, Al, Ca, B, Ni, and C. The unavoidable impurity element indicates an impurity element that is inevitably included at the time of production, etc. of a raw material and/or a magnetic powder or causes a significant rise in the production cost for avoiding its inclusion. Such an element may be substitutionally and/or interstitially present in the above-described magnetic phase or may be present in a phase other than the magnetic phase. Alternatively, the unavoidable impurity element may be present at the grain boundary between such phases. Incidentally, Ga is gallium, Ti is titanium, Cr is chromium, Zn is zinc, Mn is manganese, V is vanadium, Mo is molybdenum, W is tungsten, Si is silicon, Re is rhenium, Cu is copper, Al is aluminum, Ca is calcium, B is boron, Ni is nickel, and C is carbon.

The SmFeN powder includes a first particle group and a second particle group. The particles of the first particle group have a large particle diameter, and the particles of the second particle group have a small particle diameter. The particle diameter of the particles of each of the first particle group and the second particle group can be represented by the particle size distribution $D_{50}$. The particle size distribution $D_{50}$ of the first particle group is denoted by $d_1$ μm, and the particle size distribution $D_{50}$ of the second particle group is denoted by $d_2$ μm. The terms $d_1$ and $d_2$ satisfy the relationship of $0.350 \leq d_2/d_1 \leq 0.500$. Since this relationship is satisfied, it is apparent that $d_2 < d_1$, more specifically, while the first particle group has a large particle diameter, the second particle group has a small particle diameter.

When $d_2/d_1$ is 0.350 or more, 0.360 or more, 0.370 or more, or 0.378 or more, and 0.500 or less, 0.490 or less, 0.486 or less, 0.480 or less, 0.470 or less, or 0.467 or less, particles of the second particle group are advantageously present between particles of the first particle group, and the density of the molded body (rare earth magnet) increases, as a result, the magnetization is enhanced.

As long as the relationship above is satisfied, the particle diameter of the particles of each of the first particle group and the second particle group is not particularly limited, but in order to facilitate satisfying the relationship above, it is preferred that each of $d_1$ and $d_2$ is independently in the following range. The term d 1 is preferably 3.0 μm or more, 3.2 μm or more, or 3.4 μm or more, and may be 3.7 μm or less, 3.6 μm or less, or 3.5 μm or less. $d_2$ is preferably 1.4 μm or more or 1.5 μm or more, and is preferably 1.8 μm or less, 1.7 μm or less, or 1.6 μm or less.

In addition, the ratio between the total volume of the first particle group and the total volume of the second particle group, namely, (total volume of first particle group):(total volume of second particle group), needs to be from 9:1 to 4:1. The (total volume of first particle group):(total volume of second particle group) being 9:1 means that, for example, relative to the total volume of the SmFeN powder, the total volume of the first particle group is 90% and the total volume of the second particle group is 10%. Also, the (total volume of first particle group):(total volume of second particle group) being 4:1 means that, for example, relative to the total volume of the SmFeN powder, the total volume of the first particle group is 80% and the total volume of the second particle group is 20%.

When the (total volume of first particle group):(total volume of second particle group) is 9:1 or the total volume of the second particle group is larger than that, each particle of the second particle group are advantageously present between respective particles of the first particle group, and the density of the rare earth magnet increases, as a result, the magnetization is enhanced. From this viewpoint, the (total volume of first particle group):(total volume of second particle group) is preferably 8.8:1.2 or more, or 8.6:1.4 or more.

If particles of the second particle group are excessively present, the distance between respective particles of the first particle group rather increases. In order to avoid this, it is necessary that the (total volume of first particle group):(total volume of second particle group) is 4:1 or the total volume of the second particle group is smaller than that. In addition, as for the small-diameter SmFeN powder particles like the second particle group, the particle residual magnetization or of the particles is small and therefore, excessive presence of the second particle group leads to a reduction in the magnetization of the entire rare earth magnet. For these reasons, a reduction in the density of the rare earth magnet is suppressed by avoiding an increase of the distance between respective particles of the first particle group, and the magnetization of the rare earth magnet is enhanced by decreasing the number of particles of the second particle group having a small or. From these viewpoints, the (total volume of first particle group):(total volume of second particle group) is preferably 8.2:1.8 or less or 8.4:1.6 or less.

As for the magnetic powder including the first particle group and the second particle group, a SmFeN powder obtained by the later-described production method is classified into the first particle group and the second particle group and then, these are again mixed. The classification and mixing methods are not particularly limited, and well-known methods may be used. The classification method includes, for example, sieve classification, air classification, etc., and a combination thereof may also be used. The mixing method includes, for example, methods using an agitator mixer, a V-type mixer, etc. to execute the mixing, and these may also be used in combination.

DSO of the SmFeN powder is calculated from the particle size distribution of the SmFeN powder, and the particle size distribution of the SmFeN powder is measured (examined) by the following method. In the present description, unless otherwise indicated, the description regarding the size (particle diameter) of the SmFeN powder particles is based on the following measurement method (examination method). Incidentally, $D_{50}$ means the median diameter.

A sample obtained by filling the SmFeN powder with a resin is prepared, and the surface of the sample is polished and observed by an optical microscope. Then, straight lines are drawn on the optical microscope image, the lengths of line segments formed by sectioning the straight lines with the SmFeN particles (bright field) are measured, and the particle size distribution of the SmFeN powder is determined from the frequency distribution of the lengths of the line segments. The particle size distribution determined by this method is substantially equal to the particle size distribution determined by the linear intercept method or dry laser diffraction-scattering method.

In the SmFeN powder, fine particles are present for production reasons, etc., but as long as $d_1$ and $d_2$ satisfy the above-described relationship, the proportion of magnetic particles (fine particles) having a particle diameter of 1.0 μm or less in the SmFeN powder is not particularly limited. From the viewpoint of ensuring the mechanical strength of the molded body (rare earth magnet), the proportion of magnetic particles (fine particles) having a particle diameter of 1.0 μm or less in the SmFeN powder is preferably as low as possible. The proportion of fine particles to the total number of magnetic particles in the SmFeN powder is preferably 10.0/6 or less, 8.0% or less, 6.0% or less, or 4.0% or less. For example, in view of convenience in the production of the SmFeN powder, the number of fine particles need not be zero, and there is no problem in practice even when the lower limit of the proportion of fine particles is 1.0%, 2.0%, or 3.0%.

In the production method of the present disclosure, the later-described modifier powder is mixed with the SmFeN powder. Oxygen in the SmFeN powder is absorbed by metallic zinc or zinc alloy powder in the modifier powder, so that the magnetic properties, particularly the coercive force, of the molded body can be enhanced. The content of oxygen in the SmFeN powder may be determined in consideration of the amount of oxygen in the SmFeN powder that the modifier powder absorbs in the manufacturing process. The oxygen content in the SmFeN powder is preferably lower relative to the entire SmFeN powder. The oxygen content in the SmFeN powder is preferably 2.0 mass % or less, more preferably 1.5 mass % or less, still more preferably 1.0 mass % or less, relative to the entire SmFeN powder. On the other hand, an extreme reduction in the content of oxygen in the SmFeN powder incurs an increase in the production cost. For this reason, the content of oxygen in the SmFeN powder may be 0.1 mass % or more, 0.2 mass % or more, or 0.3 mass % or more, relative to the entire SmFeN powder.

As long as the conditions discussed above are satisfied, the production method of the SmFeN powder is not particularly limited, and a commercially available product may be used as well. The production method of the SmFeN powder includes, for example, a method where a Sm—Fe powder is produced from samarium oxide and iron powder by a reduction-diffusion method and the powder is heat-treated at 600° C. or less in an atmosphere of a mixed gas of nitrogen and hydrogen, a nitrogen gas, an ammonia gas, etc. to obtain a Sm—Fe—N powder. Alternatively, the production method includes, for example, a method where a Sm—Fe alloy is produced by a dissolution method and coarsely pulverized particles obtained by coarsely pulverizing the alloy are nitrided and further pulverized to a desired particle diameter. In the pulverization, for example, a dry jet mill, a dry ball mill, a wet ball mill, a wet bead mill, etc. may be used. These may also be used in combination.

Other than the production methods described above, the SmFeN powder can be obtained by a production method including, for example, a pretreatment step of heat-treating an oxide containing Sm and Fe in a reducing gas-containing atmosphere to obtain a partial oxide, a reduction step of heat-treating the partial oxide in the presence of a reducing agent to obtain alloy particles, and a nitridation step of subjecting the alloy particles, in an atmosphere containing nitrogen or ammonia, to a heat treatment at a first temperature of 400° C. or more and 470° C. or less and then to a heat treatment at a second temperature of 480° C. or more and 610° C. or less to obtain a nitride. Nitridation sometimes does not fully proceed into the inside of the oxide particle particularly in an alloy particle having a large particle diameter, e.g. an alloy particle containing La, but when nitridation is performed at a two-step temperature, the inside of the oxide particle is fully nitrided as well, so that an anisotropic SmFeN powder having a narrow particle size distribution and high residual magnetization can be obtained.

[Oxide Preparation Step]

The oxide containing Sm and Fe, which is used in the later-described pretreatment step, may be prepared, for example, by mixing Sm oxide and Fe oxide but is preferably produced through a step of mixing a solution containing Sm and Fe with a precipitant to obtain a precipitate containing Sm and Fe (precipitation step) and a step of firing the precipitate to obtain an oxide containing Sm and Fe (oxidation step).

[Precipitation Step]

In the precipitation step, a Sm raw material and a Fe raw material are dissolved in a strong acid solution to prepare a solution containing Sm and Fe. In the case of obtaining $Sm_2Fe_{17}N_3$ as the main phase, the molar ratio of Sm and Fe (Sm:Fe) is preferably from 1.5:17 to 3.0:17, more preferably from 2.0:17 to 2.5:17. Raw materials such as La, W, Co, Ti, Sc, Y, Pr, Nd, Pm, Gd, Tb, Dy, Ho, Er, Tm and/or Lu may be added to the above-described solution. In view of residual magnetic flux density, it is preferable to contain La. In view of coercive force and squareness ratio, it is preferable to contain W. In view of temperature properties, it is preferable to contain Co and/or Ti.

The Sm raw material and Fe raw material are not limited as long as they can dissolve in a strong acid solution. For example, in view of availability, the Sm raw material includes samarium oxide, and the Fe raw material includes $FeSO_4$. The concentration of the solution containing Sm and Fe may be appropriately adjusted in the range where the Sm raw material and Fe raw material are substantially dissolved in the acid solution. In view of solubility, the acid solution includes sulfuric acid, etc.

The solution containing Sm and Fe is reacted with a precipitant, and an insoluble precipitate containing Sm and Fe is thereby obtained. Here, the solution containing Sm and Fe may be sufficient if it is in a state of a solution containing Sm and Fe at the time of reaction with a precipitant, and, for example, after a raw material containing Sm and a raw material containing Fe are prepared as separate solutions, respective solutions may be dropped to react with a precipitant. Even in the case of preparing the raw materials as separate solutions, the solution is appropriately adjusted in the range where each raw material is substantially dissolved in the acid solution. The precipitant is not limited as long as it is an alkaline solution and reacts with the solution containing Sm and Fe to afford a precipitate, and the precipitant includes ammonia water, caustic soda, etc., with caustic soda being preferred.

From the viewpoint that the properties of particles of the precipitate can be easily adjusted, the precipitation reaction is preferably performed by a method where each of the solution containing Sm and Fe and the precipitant is dropped into a solvent such as water. A precipitate having a homogeneous distribution of constituent elements and a narrow particle size distribution as well as a refined powder shape is obtained by appropriately controlling the supply rates of the solution containing Sm and Fe and the precipitant, the reaction temperature, the reaction solution concentration, pH during reaction, etc. By using such a precipitate, the magnetic properties of the SmFeN powder as a final product are enhanced. The reaction temperature may be 0° C. or more and 50° C. or less and is preferably 35° C. or more and 45° C. or less. The reaction solution concentration is, in terms of the total concentration of metal ions, preferably 0.65 mol/L or more and 0.85 mol/L or less, more preferably 0.7 mol/L or more and 0.85 mol/L or less. The reaction pH is preferably 5 or more and 9 or less, more preferably 6.5 or more and 8 or less.

In view of magnetic properties, the solution containing Sm and Fe preferably further contains one or more metals selected from the group consisting of La, W, Co, and Ti. For example, in view of residual magnetic flux density, it is preferable to contain La; in view of coercive force and squareness ratio, it is preferable to contain W; and in view of temperature properties, it is preferable to contain Co and/or Ti. The La raw material is not limited as long as it can dissolve in a strong acid solution, and, for example, in view of availability, $La_2O_3$, $LaCl_3$, etc. are mentioned. The La raw material, W raw material, Co raw material and Ti raw material are appropriately adjusted in the range where they are substantially dissolved in an acid solution together with the Sm raw material and Fe raw material, and the acid solution includes, in view of solubility, sulfuric acid. The W raw material includes ammonium tungstate; the Co raw material includes cobalt sulfate; and the titanium raw material includes sulfated titania.

In the case where the solution containing Sm and Fe further contains one or more metals selected from the group consisting of La, W, Co, and Ti, an insoluble precipitate containing Sm, Fe, and one or more selected from the group consisting of La, W, Co, and Ti is obtained. Here, the solution may be sufficient if it contains one or more selected from the group consisting of La, W, Co, and Ti at the time of reaction with the precipitant, and, for example, after respective raw materials are prepared as separate solutions, each solution may be dropped to react with the precipitant, or they may be prepared together with the solution containing Sm and Fe.

The powder particle diameter, powder shape and particle size distribution of the finally obtained SmFeN powder are roughly determined based on the powder obtained in the precipitation step. The size and distribution are preferably such that when the particle diameter of the obtained powder is measured using a wet laser diffraction particle size distribution analyzer, substantially all the powder is in the range of 0.05 μm or more and 20 μm or less, preferably 0.1 μm or more and 10 μm or less.

After separating the precipitate, the separated precipitate is preferably desolventized so as to prevent an incident in which when the precipitate is re-dissolved in the remaining solvent during the heat treatment in the subsequent oxidation step and the solvent evaporates, the precipitate is aggregated or the particle size distribution, powder particle diameter, etc. is changed. The desolventization method specifically includes, for example, in the case of using water as the solvent, a method of drying the separated precipitate in an oven at 70° C. or more and 200° C. or less for a period of 5 hours or more and 12 hours or less.

After the precipitation step, a step of separating and washing the obtained precipitate may be provided. The washing step is appropriately performed until the conductivity of the supernatant solution becomes 5 $mS/m^2$ or less. As for the step of separating the precipitate, for example, a filtration method, a decantation method, etc. may be used after a solvent (preferably water) is added to and mixed with the obtained precipitate.

[Oxidation Step]

The oxidation step is a step of firing the precipitate formed in the precipitation step to thereby obtain an oxide containing Sm and Fe. For example, the precipitate can be converted to an oxide by a heat treatment. In the case of heat-treating the precipitate, the heat treatment needs to be performed in the presence of oxygen and may be performed, for example, in an air atmosphere. Since the heat treatment needs to be performed in the presence of oxygen, it is preferable to contain an oxygen atom in the non-metal portion of the precipitate.

The heat treatment temperature (hereinafter, sometimes referred to as "oxidation temperature") in the oxidation step is not particularly limited but is preferably 700° C. or more and 1,300° C. or less, more preferably 900° C. or more and 1,200° C. or less. It is likely that at less than 700° C., oxidation is insufficient and at more than 1,300° C., the target shape, average particle diameter and particle size distribution of the SmFeN powder are not obtained. The heat treatment time is also not particularly limited but is preferably 1 hour or more and 3 hours or less.

The obtained oxide is an oxide particle where microscopic mixing of Sm and Fe in the oxide particle is sufficiently achieved and the shape, particle size distribution, etc. of the precipitate are reflected.

[Pretreatment Step]

The pretreatment step is a step of heat-treating the above-described oxide containing Sm and Fe in a reducing gas-containing atmosphere to obtain a partial oxide where part of the oxide is reduced.

Note that the partial oxide refers to an oxide where part of the oxide is reduced. The oxygen concentration of the partial oxide is not particularly limited but is preferably 10 mass % or less, more preferably 8 mass % or less. If the concentration exceeds 10 mass %, it is likely that heat generated from reduction with Ca increases in the reduction step and in turn, the firing temperature rises, leading to the formation of particles having undergone abnormal particle growth. Here, the oxygen concentration of the partial oxide can be measured by a non-dispersive infrared absorption method (ND-IR).

The reducing gas is appropriately selected from hydrogen ($H_2$), carbon monoxide (CO), hydrocarbon gases such as methane ($CH_4$), etc., but a hydrogen gas is preferred in view of cost. The flow rate of the gas is appropriately adjusted in the range not causing scattering of the oxide. The heat treatment temperature in the pretreatment step (hereinafter, pretreatment temperature) is preferably 300° C. or more and 950° C. or less. The lower limit is more preferably 400° C. or more, still more preferably 750° C. or more, and the upper limit is more preferably less than 900° C. When the pretreatment temperature is 300° C. or more, reduction of the oxide containing Sm and Fe proceeds efficiently. Also, when the pretreatment temperature is 950° C. or less, particle growth and segregation of oxide particles are suppressed, so that the desired particle diameter can be maintained. The heat treatment time is not particularly limited but may be 1 hour or more and 50 hours or less. In addition, in the case of using hydrogen as the reducing gas, it is preferable to adjust the thickness of the oxide layer used to 20 mm or less and furthermore, adjust the dew point in the reactor to −10° C. or less.

[Reduction Step]

The reduction step is a step of subjecting the partial oxide to a heat treatment in the presence of a reducing agent to obtain alloy particles, and, for example, the reduction is performed by bringing the partial oxide into contact with calcium melt or calcium vapor. In view of magnetic properties, the heat treatment temperature is preferably 920° C. or more and 1,200° C. or less, more preferably 950° C. or more and 1,150° C. or less, still more preferably 980° C. or more and 1,100° C. or less.

Metallic calcium as the reducing agent is used in a granular or powdery form, and the particle diameter thereof is preferably 10 mm or less. Within this range, aggregation during the reduction reaction can be effectively suppressed. Also, the metallic calcium is preferably added in a ratio of 1.1 to 3.0 times, more preferably from 1.5 to 2.5 times, the reaction equivalent (a stoichiometric amount required to reduce the rare earth oxide and in the case where the Fe component is in the form of an oxide, including the amount required for its reduction).

In the reduction step, a disintegration promoter may be used, if desired, together with the metallic calcium as the reducing agent. The disintegration promoter is appropriately used so as to promote disintegration and granulation of the product in the later-described post-treatment step and includes, for example, an alkaline earth metal salt such as calcium chloride, and an alkaline earth oxide such as calcium oxide, etc. The disintegration promoter is used in a ratio of 1 mass % or more and 30 mass % or less, preferably 5 mass % or more and 30 mass % or less, per samarium oxide.

[Nitridation Step]

The nitridation step is a step of performing a nitridation treatment by subjecting, in an atmosphere containing nitrogen or ammonia, the alloy particles obtained in the reduction step to a heat treatment at a first temperature of 400° C. or more and 470° C. or less and then to a heat treatment at a second temperature of 480° C. or more and 610° C. or less to obtain anisotropic magnetic particles. Since the particulate precipitate obtained in the precipitation step above is used, porous aggregated alloy particles are obtained in the reduction step. This enables an immediate nitridation via heat treatment in a nitrogen atmosphere without performing a pulverization treatment, so that uniform nitridation can be achieved. If the alloy particles are heat-treated at a high temperature of the second temperature without being nitrided at the first temperature, abnormal heat generation may occur due to rapid progress of nitridation and in turn, SmFeN may be decomposed to significantly reduce the magnetic properties. In addition, the atmosphere in the nitridation step is preferably substantially a nitrogen-containing atmosphere, because the progress of nitridation can be more slowed down. The term “substantially” as referred to herein is used considering that elements other than nitrogen are inevitably included due to mixing, etc. of impurities, and, for example, the proportion of nitrogen in the atmosphere is 95% or more, preferably 97% or more, more preferably 99% or more.

The first temperature in the nitridation step is 400° C. or more and 470° C. or less but is preferably 410° C. or more and 450° C. or less. If the temperature is less than 400° C., the progress of nitridation is very slow, and if it exceeds 470° C., over nitridation or decomposition is likely to occur due to heat generation. The heat treatment time at the first temperature is not particularly limited but is preferably 1 hour or more and 40 hours or less, more preferably 20 hours or less. If the heat treatment time is less than 1 hour, the nitridation may not proceed sufficiently, and if it exceeds 40 hours, the productivity is reduced.

The second temperature is 480° C. or more and 610° C. or less but is preferably 500° C. or more and 550° C. or less. If the second temperature is less than 480° C., when the particles are large, the nitridation may not proceed sufficiently, and if it exceeds 610° C., over nitridation or decomposition is likely to occur. The heat treatment time at the second temperature is preferably 15 minutes or more and 5 hours or less, more preferably 30 minutes or more and 2 hours or less. If the heat treatment time is less than 15 minutes, the nitridation may not proceed sufficiently, and if it exceeds 5 hours, the productivity is reduced.

The heat treatment at the first temperature and the heat treatment at the second temperature may be performed successively, and a heat treatment at a temperature lower than the second temperature may be provided therebetween, but in view of productivity, those heat treatments are preferably performed successively.

[Post-Treatment Step]

The product obtained after the nitridation step contains by-produced CaO, unreacted metallic calcium, etc., in addition to the magnetic particles, and these are sometimes combined to form a sintered aggregate state. The CaO and metallic calcium can be separated as a calcium hydroxide ($Ca(OH)_2$) suspension by introducing the product obtained after the nitridation step into cooling water. Furthermore, the remaining calcium hydroxide may be fully removed by washing the magnetic powder with acetic acid, etc. Upon introducing the product into water, disintegration, i.e., micronization, of the reaction product in a combined and sintered aggregate state proceeds due to oxidation of metallic calcium with water and hydration of by-produced CaO.

[Alkali Treatment Step]

The product obtained after the nitridation step may be introduced into an alkaline solution. The alkaline solution used in the alkali treatment step includes, for example, an aqueous calcium hydroxide solution, an aqueous sodium hydroxide solution, an aqueous ammonia solution, etc. Among these, in view of wastewater treatment and high pH, an aqueous calcium hydroxide solution and an aqueous sodium hydroxide solution are preferred. A Sm-rich layer containing some oxygen remains as a result of the alkali treatment of the product and functions as a protective layer and consequently, an increase in the oxygen concentration due to the alkali treatment is suppressed.

The pH of the alkaline solution used in the alkali treatment step is not particularly limited but is preferably 9 or more, more preferably 10 or more. If the pH is less than 9, the reaction rate at the time of forming calcium hydroxide is high, and large heat generation occurs, as a result, the oxygen concentration of the finally obtained SmFeN powder tends to be high.

As for the SmFeN powder obtained after treatment with an alkaline solution in the alkali treatment step, its water content can also be reduced, if desired, by decantation or other like methods.

[Acid Treatment Step]

After the alkali treatment step, an acid treatment step of further treating the powder with an acid may be provided. In the acid treatment step, at least part of the Sm-rich layer above is removed to reduce the oxygen concentration in the entire SmFeN powder. Also, in the manufacturing method presented in an embodiment of the present invention, pulverization, etc. is not performed, and the SmFeN powder therefore has a small average particle diameter and a narrow particle size distribution and in addition, does not include fine powder produced by pulverization, etc., so that an increase in the oxygen concentration can be suppressed.

The acid used in the acid treatment step is not particularly limited and includes, for example, hydrogen chloride, nitric acid, sulfuric acid, acetic acid, etc. Among these, in view of no remaining of impurities, hydrogen chloride and nitric acid are preferred.

The amount of the acid used in the acid treatment step is preferably 3.5 parts by mass or more and 13.5 parts by mass or less, more preferably 4 parts by mass or more and 10 parts by mass or less, per 100 parts by mass of the SmFeN powder. If the amount used is less than 3.5 parts by mass, oxide on the surface of the SmFeN powder remains to increase the oxygen concentration, whereas if the amount used exceeds 13.5 parts by mass, reoxidation is likely to occur upon exposure to the atmosphere and since the acid dissolves the SmFeN powder, the cost also tends to rise. When the amount of the acid is 3.5 parts by mass or more and 13.5 parts by mass or less per 100 parts by mass of the SmFeN powder, a Sm-rich layer oxidized to such a degree that reoxidation is less likely to occur upon exposure to the atmosphere after the acid treatment can cover the SmFeN powder surface and therefore, a SmFeN powder having a low oxygen concentration, a small average particle diameter, and a narrow particle size distribution is obtained.

As for the SmFeN powder obtained after treatment with an acid in the acid treatment step, its water content can also be reduced, if desired, by decantation or other like methods.

[Dehydration Step]

It is preferable to include, after the acid treatment step, a step of performing a dehydration treatment. By the dehydration treatment, the amount of moisture in the solid content before vacuum drying can be reduced, and the progress of oxidation during drying, which occurs due to a larger amount of moisture contained in the solid content before vacuum drying, can be suppressed. Here, the dehydration treatment means a treatment of reducing the moisture value contained in the solid content after the treatment relative to the solid content before the treatment by applying a pressure or centrifugal force and does not encompass simple decantation, filtration or drying. The method for the dehydration treatment is not particularly limited but includes compression, centrifugal separation, etc.

The amount of water contained in the SmFeN powder after the dehydration treatment is not particularly limited but, from the viewpoint of suppressing the progress of oxidation, is preferably 13 mass % or less, more preferably 10 mass % or less.

The SmFeN powder obtained by performing the acid treatment or the SmFeN powder obtained by performing the dehydration treatment after the acid treatment is preferably vacuum-dried. The drying temperature is not particularly limited but is preferably 70° C. or more, more preferably 75° C. or more. The drying time is also not particularly limited but is preferably 1 hour or more, more preferably 3 hours or more.

<Modifier Powder Preparation Step>

A modifier powder is prepared. The modifier powder used in the production method of the present disclosure contains at least either metallic zinc or zinc alloy. The metallic zinc means zinc that is not alloyed. Particles of the SmFeN powder are bonded and modified by the zinc component in the modifier powder.

In the SmFeN powder particles, a Fe—Zn alloy phase is formed on their surface. On the surface of the SmFeN powder particles, the crystal structure such as $Th_2Zn_{17}$ type and/or $Th_2Ni_{17}$ type is not complete in some portions, and in such portions, an α-Fe phase is present and causes a reduction in the coercive force. The α-Fe phase forms a Fe—Zn alloy phase together with the zinc component of the metallic zinc and/or zinc alloy to suppress the reduction in the coercive force. More specifically, the Fe—Zn alloy phase acts as a modified phase. Fe and Zn interdiffuse between particles of the SmFeN powder and particles of the modifier powder and form a Fe—Zn alloy phase. Consequently, the SmFeN powder particles can be strongly bonded to each other. That is, the modifier powder functions as a binder.

When the content ratio of the zinc component in the modifier powder is 1 mass % or more relative to the mixed powder, a homogeneous Fe—Zn alloy phase (modified phase) is formed and therefore, the coercive force is enhanced, so that the function as a binder can be advantageously exhibited. From this viewpoint, the content ratio of metallic zinc in the modifier powder may be 3 mass % or more, 5 mass % or more, 10 mass % or more, 15 mass % or more, or 20 mass % or more, relative to the mixed powder.

On the other hand, when the content ratio of the zinc component in the modifier powder is 30 mass % or less relative to the mixed powder, a reduction in magnetization due to use of the modifier powder can be suppressed. From this viewpoint, the content ratio of the zinc component in the modifier powder may be 28 mass % or less, 26 mass % or less, 24 mass % or less, or 22 mass % or less, relative to the mixed powder.

When the zinc alloy is represented by Zn-$M^2$, an element that is alloyed with Zn (zinc) to drop the melting start temperature of the zinc alloy below the melting point of Zn, and an unavoidable impurity element may be selected as $M^2$. In this case, the sinterability in the later-described pressure sintering step is enhanced. $M^2$ that drops the melting start temperature below the melting point of Zn includes an element, etc. that forms a eutectic alloy between Zn and $M^2$. Such $M^2$ includes, typically, for example, Sn, Mg, Al, and a combination of these. Sn is tin, Mg is magnesium, and Al is aluminum. An element that does not inhibit the melting point dropping action of these elements as well as the properties of the product can also be selected as $M^2$. Incidentally, the unavoidable impurity element indicates an impurity element that is inevitably included or causes a significant rise in the production cost to avoid its inclusion, such as impurities contained in raw materials of the modifier powder.

In the zinc alloy represented by Zn-$M^2$, the ratios (molar ratios) of Zn and $M^2$ may be appropriately determined to give an appropriate sintering temperature. The ratio (molar ratio) of $M^2$ to the entire zinc alloy may be, for example, 0.05 or more, 0.10 or more, or 0.20 or more, and may be 0.90 or less, 0.80 or less, 0.70 or less, 0.60 or less, 0.50 or less, 0.40 or less, or 0.30 or less.

The modifier powder may optionally contain, other than the metallic zinc and/or zinc alloy, a substance having a binder function and/or a modification function as well as other functions, within a range not impairing the effects of the present invention. Other functions include, for example, a function of enhancing corrosion resistance.

The particle diameter of the modifier powder is not particularly limited but is preferably smaller than the particle diameter of the SmFeN powder of the first particle group and more preferably smaller than the particle diameter of the SmFeN powder of the second particle group. This facilitates spreading of particles of the modifier powder among particles of the SmFeN powder. The particle diameter of the modifier powder may be, for example, in terms of $D_{50}$ (median diameter), 0.1 μm or more, 0.2 μm or more, 0.3 μm or more, or 0.4 μm or more, and may be 12.0 μm or less, 11.0 μm or less, 10.0 μm or less, 9.0 μm or less, 8.0 μm or less, 7.0 μm or less, 6.0 μm or less, 5.0 μm or less, 4.0 μm or less, 2.0 μm or less, 1.0 μm or less, or 0.5 μm or less. Incidentally, the particle diameter $D_{50}$ (median diameter) of the modifier powder is measured, for example, by a dry laser diffraction, scattering method.

When the oxygen content of the modifier powder is small, much oxygen in the SmFeN powder can be advantageously absorbed. From this viewpoint, the oxygen content of the modifier powder is preferably 5.0 mass % or less, more preferably 3.0 mass % or less, and still more preferably 1.0 mass % or less, relative to the entire modifier powder. On the other hand, for extremely reducing the oxygen content of the modifier powder, an increase in the manufacturing cost is caused. For this reason, the oxygen content of the modifier powder may be 0.1 mass % or more, 0.2 mass % or more, or 0.3 mass % or more, relative to the entire modifier powder.

<Mixing Step>

The SmFeN powder and the modifier powder are mixed to obtain a mixed powder. The mixing method is not particularly limited. The mixing method includes a methods of mixing the powders by means of a mortar, a muller wheel mixer, an agitator mixer, a mechanofusion, a V-type mixer, a ball mill, etc. These methods may be combined. The V-type mixer is an apparatus having a container formed by connecting two cylindrical containers in V shape, in which when the containers are rotated, the powders in the containers are caused to repeatedly experience aggregation and separation due to gravity and centrifugal force and thereby mixed.

<Magnetic-Field Molding Step>

The mixed powder is compression-molded in a magnetic field to obtain a magnetic-field molded body. Orientation can thereby be imparted to the magnetic-field molded body and in turn, anisotropy can be imparted to the molded body (rare earth magnet) to enhance residual magnetization.

The magnetic-field molding method may be a well-known method such as a method of compression-molding the mixed powder by use of a molding die having arranged therearound a magnetic field generation device. The molding pressure may be, for example, 10 MPa or more, 20 MPa or more, 30 MPa or more, 50 MPa or more, 100 MPa or more, or 150 MPa or more, and may be 1,500 MPa or less, 1,000 MPa or less, or 500 MPa or less. The time for which the molding pressure is applied may be, for example, 0.5 minutes or more, 1 minute or more, or 3 minutes or more, and may be 10 minutes or less, 7 minutes or less, or 5 minutes or less. The magnitude of the magnetic field applied may be, for example, 500 kA/m or more, 1,000 kA/m or more, 1,500 kA/m or more, or 1,600 kA/m or more, and may be 20,000 kA/m or less, 15,000 kA/m or less, 10,000 kA/m or less, 5,000 kA/m or less, 3,000 kA/m or less, or 2,000 kA/m or less. The method for applying a magnetic field includes, e.g., a method of applying a static magnetic field using an electromagnet, and a method of applying a pulsed magnetic field using an alternating current. Also, in order to prevent oxidation of the mixed powder, the magnetic-field molding is preferably performed in an inert gas atmosphere. The inert gas atmosphere encompasses a nitrogen gas atmosphere.

<Pressure Sintering Step>

The magnetic-field molded body is pressure-sintered to obtain a sintered body. The method for pressure sintering is not particularly limited, and a well-known method can be applied. The pressure sintering method includes, for example, a method where a die having a cavity and a punch capable of sliding inside the cavity are prepared, the magnetic-field molded body is inserted into the cavity and while applying a pressure to the magnetic-field molded body by means of the punch, the magnetic-field molded body is sintered. In this method, typically, the die is heated using a high-frequency induction coil. Alternatively, a Spark Plasma Sintering (SPS) method may also be used.

The pressure sintering conditions may be appropriately selected so that the magnetic-field molded body can be sintered while applying a pressure to the magnetic-field molded body (hereinafter, sometimes referred to as "pressure-sintered").

When the sintering temperature is 300° C. or more, Fe on the particle surface of the SmFeN powder and the metallic zinc in the modifier powder slightly interdiffuse in the magnetic-field molded body to contribute to sintering. From this viewpoint, the sintering temperature may be, for example, 310° C. or more, 320° C. or more, 340° C. or more, or 350° C. or more. On the other hand, when the sintering temperature is 430° C. or less, Fe on the particle surface of the SmFeN powder and the metallic zinc in the modifier powder are kept from excessively interdiffusing, as a result, it is unlikely that a trouble occurs in the later-described heat treatment step or an adverse effect is exerted on the magnetic properties of the obtained sintered body. From this viewpoint, the sintering temperature may be 420° C. or less, 410° C. or less, 400° C. or less, 390° C. or less, 380° C. or less, 370° C. or less, or 360° C. or less.

As for the sintering pressure, a sintering pressure capable of increasing the density of the sintered body may be appropriately selected. Typically, the sintering pressure may be 100 MPa or more, 200 MPa or more, 400 MPa or more, 600 MPa or more, 800 MPa or more, or 1,000 MPa or more, and may be 2,000 MPa or less, 1,800 MPa or less, 1,600 MPa or less, 1,500 MPa or less, 1,300 MPa or less, or 1,200 MPa or less.

The sintering time may be appropriately determined such that Fe on the particle surface of the SmFeN powder slightly interdiffuses with the modifier powder. The sintering time does not include the temperature rise time until reaching the heat treatment temperature. The sintering time may be, for example, 1 minute or more, 2 minutes or more, or 3 minutes or more, and may be 30 minutes or less, 20 minutes or less, 10 minutes or less, or 5 minutes or less.

Upon elapse of the sintering time, the sintering is ended by cooling the sintered body. At a higher cooling rate, oxidation, etc. of the sintered body can be suppressed. The cooling rate may be, for example, from 0.5 to 200° C./sec.

The sintering atmosphere is preferably an inert gas atmosphere such as argon gas atmosphere, so as to suppress oxidation of the magnetic-field molded body and sintered body. The inert gas atmosphere encompasses a nitrogen gas atmosphere.

As described above, Fe on the SmFeN powder particle surface slightly interdiffuses with the modifier powder during pressure sintering, but part of the slight interdiffusion portion may optionally be caused to proceed for allowing the progress of modification. In this case, a modification-inhibiting coating formation step and a heat treatment step are performed. The modification-inhibiting coating formation step and heat treatment step are described below.

<Modification-Inhibiting Coating Formation Step>

Before the pressure sintering, a modification-inhibiting coating is formed in advance on the particle surface of the second particle group. Due to formation of this coating, modification of the particle surface of the second particle group can be suppressed. The formation of a modification-inhibiting coating is sufficient as long as it is before pressure sintering, and typically, the coating is formed before mixing the SmFeN powder and the modifier powder.

The reason for suppressing modification of the particle surface of the second particle group is described below.

When the sintered body obtained by pressure sintering is further heat-treated, interdiffusion between Fe on the SmFeN powder particle surface and the modifier powder proceeds, and modification proceeds, contributing to enhancement of the coercive force. Details of the heat treatment step are described later.

The SmFeN powder used in the production method of the present disclosure includes a first particle group having a large particle diameter and a second particle group 12 a small particle diameter. Due to this configuration, the density of the sintered body is increased, as a result, the magnetization is enhanced. When the sintered body obtained as above is heat-treated, since particles of the second particle group have a large specific surface area, they readily allow the progress of modification, and part of the magnetic phase in the particles of the second particle group is also modified. Then, even when the density of the sintered body is increased, the magnetization may be somewhat reduced. For this reason, it is preferable to suppress modification of the particle surface of the second particle group by forming a modification-inhibiting coating on the particle surface of the second particle group in advance before the pressure sintering. As a result, modification of part of the magnetic phase in the particles of the second particle group can be avoided, making it possible to avoid some reduction in the magnetization.

As described above, the first particle group and the second particle group are obtained by classifying the SmFeN powder. At this time, the second particle group has a high coercive force, compared to the first particle group, and therefore, the second particle group need not be modified as much as the first particle group. For this reason, it is advantageous to suppress the modification of the particle surface of the second particle group.

In addition, when a magnetic powder having a high coercive force (hereinafter, sometimes referred to as "high coercivity powder") and a magnetic powder having a low coercive force (hereinafter, sometimes referred to as "low coercivity powder") are present together in the magnetic powder, the squareness of the molded body of such a magnetic powder, particularly the squareness at a high temperature, is sometimes reduced. This may be described as follows by referring to the drawing. Incidentally, unless otherwise indicated, regarding the magnetic properties, the "high temperature" means from 100 to 200° C., and the squareness is evaluated by the 10% demagnetization Hk.

Figure 10:
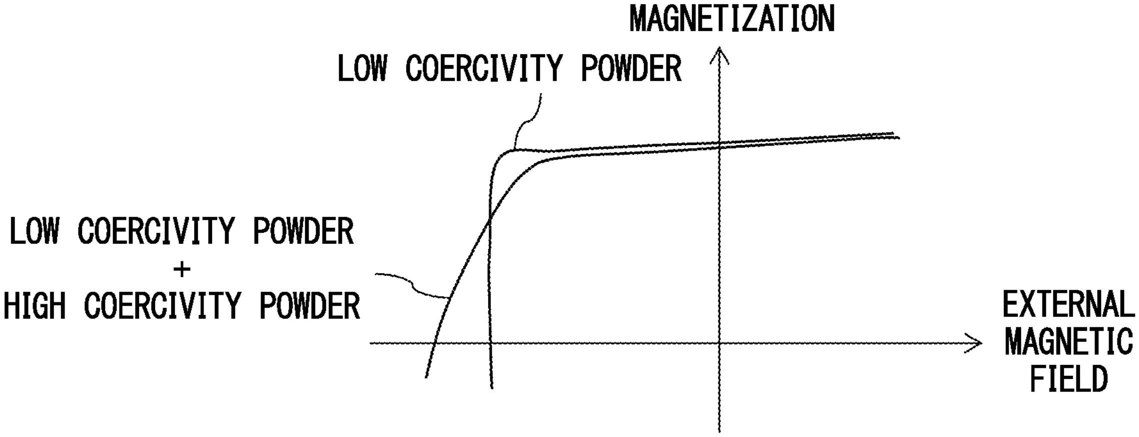
FIG. 10 is a graph illustrating a demagnetization curve of a molded body of a low coercivity powder and a demagnetization curve of a molded body of a mixed powder of low coercivity powder and high coercivity powder, at a high temperature.

FIG. 10 is a graph illustrating a demagnetization curve of a molded body of a low coercivity powder and a demagnetization curve of a molded body of a mixed powder of low coercivity powder and high coercivity powder, at a high temperature. It is understood from FIG. 10 that compared with the molded body of a mixed powder of low coercivity powder and high coercivity powder, the molded body of a low coercivity powder has excellent squareness, though the coercive force is low.

As described above, the first particle group corresponds to the low coercivity powder, and the second particle group corresponds to the high coercivity powder. When a modification-inhibiting coating is formed on the second particle group, the second particle group can be kept from having a higher coercive force. Consequently, the difference between the coercive force of the first particle group and the coercive force of the second particle group can be prevented from widening, and the squareness can be enhanced. As a result, even when the magnetization is enhanced by increasing the density of the sintered body by use of the first particle group and the second particle group, the squareness can be enhanced, and this is more advantageous.

The modification-inhibiting coating is not particularly limited as long as it can inhibit interdiffusion of Fe of the magnetic phase in the particles of the second particle group and on the particle surface of the second particle group with the modifier powder and does not adversely affect the magnetic properties of the rare earth magnet obtained by the production method of the present disclosure. Such a modification-inhibiting coating typically contains phosphoric acid, but the configuration is not limited thereto.

In the case where the modification-inhibiting coating is a coating containing phosphoric acid, the content ratio of phosphoric acid in the modification-inhibiting coating may be, relative to the entire modification-inhibiting coating, 40 mass % or more, 50 mass % or more, 60 mass % or more, 70 mass % or more, 80 mass % or more, or 90 mass % or more, and may even be 100 mass %. Also, in the case where the modification-inhibiting coating is a coating containing phosphoric acid, the thickness thereof may be 5 nm or more, 10 nm or more, 20 nm or more, 30 nm or more, 40 nm or more, or 50 nm or more, and may be 100 nm or less, 90 nm or less, 80 nm or less, 70 nm or less, or 60 nm or less.

The method for forming a phosphoric acid-containing coating on the second particle group is not particularly limited but includes, for example, the following method.

The particles of the second particle group are subjected to a phosphate treatment to form a passive film having a P—O bond on the particle surface of the second particle group. In the phosphate treatment step, a phosphate treatment agent is reacted with the particles of the second particle group. The phosphate treatment agent includes, for example, inorganic phosphoric acids and organic phosphoric acids, e.g., orthophosphoric acid, a phosphate type such as sodium dihydrogen phosphate, disodium hydrogen phosphate, ammonium dihydrogen phosphate, diammonium hydrogen phosphate, zinc phosphate and calcium phosphate, a hypophosphorous acid type, a hypophosphite type, pyrophosphoric acid, and a polyphosphoric acid type. Such a phosphate source is basically dissolved in water or in an organic solvent such as IPN, and after a reaction accelerator such as nitrate ion or a grain refiner such as V ion, Cr ion or Mo ion is, if desired, added thereto, the particles of the second particle group are introduced into the resulting phosphate bath to form a passive film having a P—O bond on the particle surface of the second particle group.

<Heat Treatment Step>

In the case where a modification-inhibiting coating is formed on the particle surface of the second particle group in advance before the pressure sintering (hereinafter, sometimes simply referred to as "a modification-inhibiting coating is formed on the particle surface of the second particle group"), the sintered body after pressure sintering is heat-treated to allow the progress of modification of the particle surface of the first particle group. This is described by referring to the drawings.

Figure 11:
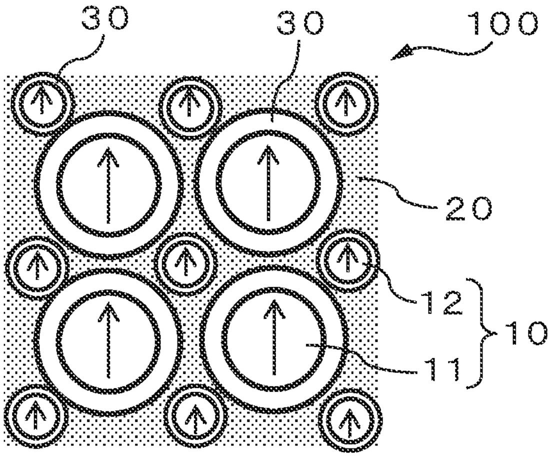
FIG. 11 is a schematic diagram illustrating one example of the microstructure of a rare earth magnet obtained by forming a modification-inhibiting coating on the particle surface of the second particle group and performing pressure sintering and heat treatment.
Figure 12:
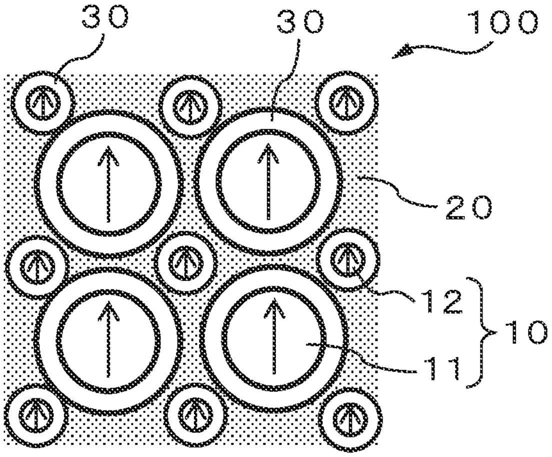
FIG. 12 is a schematic diagram illustrating one example of the microstructure of a rare earth magnet obtained by performing pressure sintering and heat treatment without forming a modification-inhibiting coating on the particle surface of the second particle group.

FIG. 11 is a schematic diagram illustrating one example of the microstructure of a rare earth magnet obtained by forming a modification-inhibiting coating on the particle surface of the second particle group and performing pressure sintering and heat treatment. FIG. 12 is a schematic diagram illustrating one example of the microstructure of a rare earth magnet obtained by performing pressure sintering and heat treatment without forming a modification-inhibiting coating on the particle surface of the second particle group. The microstructures of FIGS. 11 and 12 are described by comparison with the microstructure of FIG. 1.

Compared with the microstructure of FIG. 1, in both the microstructures of FIG. 11 and FIG. 12, the modified phase 30 on the particle surface of the first particle group 11 is slightly thick. This is attributable to the fact that although the sintered body is not heat-treated for obtaining the rare earth magnet having the microstructure of FIG. 1, the sintered body is heat-treated for obtaining the rare earth magnets having the microstructures of FIG. 11 or FIG. 12 and the heat treatment causes modification of the particle surface of the first particle group 11 to proceed. Since the particles of the first particle group 11 have a relatively small specific surface area, modification is kept from excessively proceeding during the heat treatment, and compared with the case of not performing the heat treatment, the modified phase 30 only becomes slightly thick.

Compared with the microstructure of FIG. 1, in the microstructure of FIG. 11, the thickness of the modified phase 30 on the particle surface of the second particle group 12 is substantially the same, whereas in the microstructure of FIG. 12, the modified phase 30 on the particle surface of the second particle group 12 is thick. This is attributable to the fact that a modification-inhibiting coating is formed on the particle surface of the second particle group 12 for obtaining a rare earth magnet having the microstructure of FIG. 11 but a modification-inhibiting coating is not formed on the particle surface of the second particle group 12 for obtaining a rare earth magnet having the microstructure of FIG. 12. Consequently, modification of the particle surface of the second particle group 12 scarcely proceeds during heat treatment of the sintered body at the time of obtaining a rare earth magnet having the microstructure of FIG. 11, whereas modification of the particle surface of the second particle group 12 readily proceeds during heat treatment of the sintered body at the time of obtaining a rare earth magnet having the microstructure of FIG. 12. In the microstructure of FIG. 11, the progress of modification of the particle surface of the second particle group 12 is suppressed and therefore, the squareness is enhanced. For this reason, it is preferable to form a modification-inhibiting coating on the particle surface of the second particle group 12.

Although not bound by the theory, it is considered that the modification-inhibiting coating formed on the particle surface of the second particle group is decomposed into elements constituting the modification-inhibiting coating in the process of heat-treating the sintered body after pressuring sintering and these elements are present in the modified phase. This suggests that the modified phase is a phase where elements derived from the above-described modification-inhibiting coating are present in the Fe—Zn alloy phase.

As for the heat treatment conditions for the sintered body after the pressure sintering, conditions capable of modifying the SmFeN powder particle surface, particularly, the particle surface of the first particle group, may be appropriately determined. The heat treatment temperature may be, for example, 350° C. or more, 360° C. or more, 370° C. or more, or 380° C. or more, and may be 410° C. or less, 400° C. or less, or 390° C. or less. The heat treatment time may be 6 hours or more, 12 hours or more, or 18 hours or more, and may be 48 hours or less, 42 hours or less, 36 hours or less, 30 hours or less, or 24 hours or less.

When the sintered body after pressure sintering is heat-treated under the above-described heat treatment conditions, the thickness of the modified phase on the particle surface of the first particle group is, for example, approximately from 20 to 50 nm. Because, the modification-inhibiting coating is not formed on the particle surface of the first particle group. Also, when the sintered body after the pressure sintering is heat-treated under the above-described heat treatment conditions, the thickness of the modified phase on the surface of particles of the second particle group is approximately from 20 to 50 nm in the case of not forming the modification-inhibiting coating and is approximately from 1 to 20 nm in the case of forming the modification-inhibiting coating.

In order to suppress oxidation of the sintered body, the sintered body is preferably heat-treated in a vacuum or in an inert gas atmosphere, and the inert gas atmosphere encompasses a nitrogen gas atmosphere. The heat treatment of the sintered body may be performed following the pressure sintering in a molding die used for the pressure sintering, but in this case, a pressure is not imposed on the sintered body during heat treatment. The molding die used for the pressure sintering is, for example, a die having a cavity. When the above-described heat treatment conditions are satisfied, it is unlikely that a normal magnetic phase is decomposed to form an α-Fe phase and as a result of this formation, Fe and Zn are excessively interdiffused. In the case of performing the heat treatment in a vacuum, the absolute pressure in the atmosphere may be $1\times10^{-7}$ Pa or more, $1\times10^{-6}$ Pa or more, or $1\times10^{-5}$ Pa or more, and may be $1\times10^{-2}$ Pa or less, $1\times10^{-3}$ Pa or less, or $1\times10^{-4}$ Pa or less.

The rare earth magnet obtained by the hereinabove-described manufacturing method of the present disclosure is described below.

<<Rare Earth Magnet>>

The rare earth magnet obtained by the production method of the present disclosure (hereinafter, sometimes referred to as "the rare earth magnet of the present disclosure") has a magnetic phase containing Sm, Fe and N and at least partially having a crystal structure of either $Th_2Zn_{17}$ type or $Th_2Ni_{17}$ type. The composition, etc. of the magnetic phase are as described in "<Magnetic Powder Preparation Step>".

The rare earth magnet of the present disclosure is obtained using a mixed powder of SmFeN powder and modifier powder containing at least either metallic zinc or a zinc alloy. Therefore, the rare earth magnet of the present disclosure contains a zinc component derived from the modifier powder. As described above, part of the SmFeN powder particles and part of the zinc component of the modifier powder are interdiffused to form a Fe—Zn alloy phase. In the present description, unless otherwise indicated, the content of the "zinc component" means the content (content ratio) of Zn (zinc element). The zinc component of the rare earth magnet of the present disclosure is derived from the metallic zinc of the modifier powder, and the content of the zinc component is preferably from 1 to 30 mass %.

<<Alteration>>

In the production method of the present disclosure, other than those described hereinbefore, various alterations can be added within the scope of contents as set forth in claims.

For example, part of fine particles in the SmFeN powder may be removed in advance before magnetic-field molding. The fine particle-removing operation (fine particle-removing method) is not particularly limited. The fine particle-removing operation (fine particle-removing method) includes, e.g., a method using a cyclone (registered trademark) classifier, a method using a sieve, a method utilizing a magnetic field, and a method utilizing static electricity. The operation may also be a combination of these methods. The removal of fine particles makes it possible to further increase the density of the molded body (rare earth magnet) and further enhance the magnetization.

EXAMPLES

The production method of the present disclosure is described more specifically below by referring to Examples and Comparative Examples. The production method of the present disclosure is not limited to the conditions employed in the following Examples.

<<Preparation of Sample>>

Samples of Examples 1 to 8 and Comparative Examples 1 to 7 were prepared in the following manner.

Examples 1 to 8 and Comparative Examples 1 to 5

5.0 kg of $FeSO_4.7H_2O$ was mixed and dissolved in 2.0 kg of pure water. Furthermore, 0.49 kg of $Sm_2O_3$, 0.74 kg of 70% sulfuric acid, and 0.035 kg of $La_2O_3$ were added, and these were thoroughly stirred and thereby completely dissolved. Next, pure water was added to the resulting solution so as to adjust the Fe concentration and Sm concentration to finally 0.726 mol/L and 0.112 mol/L, respectively. Thus, a SmFeLa sulfuric acid solution was obtained.

[Precipitation Step]

The entire amount of the prepared SmFeLa sulfuric acid solution was added dropwise to 20 kg of pure water kept at a temperature of 40° C. with stirring over 70 minutes from the start of the reaction, and a 15% ammonia solution was added dropwise at the same time to adjust the pH to 7 to 8. Consequently, a slurry containing SmFeLa hydroxide was obtained. The obtained slurry was washed with pure water by decantation, and the hydroxide was then separated by solid-liquid separation. The separated hydroxide was dried for 10 hours in an oven at 100° C.

[Oxidation Step]

The hydroxide obtained in the precipitation step was fired in the atmosphere at 1,000° C. for 1 hour. After cooling, a red SmFeLa oxide was obtained as a raw material powder.

[Pretreatment Step]

100 g of the SmFeLa oxide was put in a steel container to a thickness of 10 mm. The container was placed in a furnace, and after reducing the pressure to 100 Pa, the temperature was raised to a pretreatment temperature of 850° C. while introducing hydrogen gas and held as it was for 15 hours. The oxygen concentration was measured by a non-dispersive infrared absorption method (ND-IR) (EMGA-820, manufactured by Horiba Ltd.) and found to be 5 mass %. This reveals that there was obtained a black partial oxide in which oxygen bonded to Sm is not reduced and 95% of oxygen bonded to Fe is reduced. [Reduction Step]60 g of the partial oxide obtained in the pretreatment step was mixed with 19.2 g of a metallic calcium having an average particle diameter of about 6 mm, and the mixture was placed in a furnace. After the inside of the furnace was evacuated to a vacuum, an argon gas (Ar gas) was introduced, and the temperature was raised to 1,090° C. and held for 45 minutes, followed by cooling to obtain SmFe powder particles.

[Nitridation Step]

Subsequently, the temperature inside the furnace was cooled to 100° C., followed by vacuum evacuation, and the temperature was then raised to 430° C. of the first temperature and held for 3 hours. Furthermore, the temperature was raised to 500° C. of the second temperature and held for 1 hour, followed by cooling to obtain a magnetic particle-containing aggregated product.

[Post-Treatment Step]

The aggregated product obtained in the nitridation step was introduced into 3 kg of pure water and stirred for 30 minutes. After standing still, the supernatant was drained by decantation. The introduction into pure water, stirring, and decantation were repeated 10 times. Subsequently, 2.5 g of 99.9% acetic acid was introduced and stirred for 15 minutes. After standing still, the supernatant was drained by decantation. The introduction into pure water, stirring, and decantation were repeated twice.

[Acid Treatment Step]

An aqueous 6% hydrochloric acid solution was added such that its amount becomes 4.3 parts by mass in terms of hydrogen chloride per 100 parts by mass of the powder obtained in the post treatment, and stirred for 1 minute. After standing still, the supernatant was drained by decantation. The introduction into pure water, stirring, and decantation were repeated twice. Following solid-liquid separation, vacuum drying was performed at 80° C. for 3 hours to obtain a SmFeN powder having a composition of $Sm_{9.2}Fe_{77.1}N_{13.59}La_{0.11}$.

The SmFeN powder was packed into a sample container together with paraffin wax and after the paraffin was melted using a drier, the easy axes of magnetization were aligned with an orientation magnetic field of 16 kA/m. The sample subjected to magnetic field orientation was pulse magnetized in a magnetizing magnetic field of 32 kA/m and measured for magnetic properties at room temperature by means of VSM (vibrating sample magnetometer) having a maximum magnetic field of 16 kA/m, as a result, the residual magnetization and coercive force were 1.44 T and 750 kA/m, respectively.

The SmFeN powder obtained as above was classified to obtain a powder of the first particle group and a powder of the second particle group. Then, the powder of the first particle group and the powder of the second particle group were mixed using a V-type mixer to obtain a magnetic powder. The particle size distribution of each of the first particle group and the second particle group was as shown in Table 1. The ratio between the total volume of the first particle group and the total volume of the second particle group (total volume of first particle group:total volume of second particle group) was as shown in Table 1-1, In Table 1-1, the particle residual magnetization or of each of the first particle group and the second particle group is shown together.

A metallic zinc powder was prepared as the modifier powder. The $D_{50}$ of the metallic zinc powder was 0.5 μm. In addition, the purity of the metallic zinc powder was 99.5 mass %.

The magnetic powder (powder of the first particle group and powder of the second particle group) and the modifier powder were mixed to obtain a mixed powder. The mixing amount of the metallic zinc relative to the entire mixed powder was 5 mass %.

The mixed powder was compression-molded in a magnetic field to obtain a magnetic-field molded body. The pressure for the compression molding was 50 MPa. The pressure application time was 1 minute. The applied magnetic field was 1,600 kA/m. In addition, the compression molding was performed in a nitrogen atmosphere.

The magnetic-field molded body was pressure-sintered. With respect to the samples of Examples 1 to 6 and Comparative Examples 1 to 5, the pressure sintering was performed using a high-frequency induction coil in an argon gas atmosphere (97,000 Pa). With respect to the samples of Examples 7 and 8, the pressure sintering was performed using discharge plasma heating (SPS method) in a nitrogen gas atmosphere (10,000 Pa). In all the samples, the sintering temperature was 380° C., the sintering pressure was 1,000 MPa, and the sintering pressure application time was 5 minutes.

Comparative Examples 6 and 7

The sample of Comparative Example 6 and the sample of Comparative Example 7 were prepared in the same manner as in Example 1 and Example 3, respectively, other than as the magnetic powder, only the powder of the first particle group was used and the powder of the second particle group was not used.

Example 9

The sample of Example 9 was prepared in the same manner as in Example 4 other than a phosphoric acid-containing coating was formed on the particle surface of the second particle group and the sintered body after pressure sintering was heat-treated. The formation of the phosphoric acid-containing coating was performed before mixing the SmFeN powder (powder of the first particle group and powder of the second particle group) and the modifier powder. More specifically, the SmFeN powder was classified into a first particle group and a second particle group, a phosphoric acid-containing coating was formed on the particle surface of the second particle group, and the powder of the as-classified first particle group, the powder of the second particle group where a phosphoric acid-containing coating was formed, and the modifier powder were mixed.

In forming the phosphoric acid-containing coating, a dispersion step and a surface treatment step were performed as preparation steps before the phosphoric acid treatment step. Details of the dispersion step and surface treatment step as well as the phosphoric acid treatment step are as follows.

[Dispersion Step]

The powder of the second particle group and a media were put in a container used for a vibration mill such that relative to the volume of the container, the powder of the second particle group accounts for 5 vol % and the media (iron-cored nylon media, diameter: 10 mm, Vickers constant of nylon in coating portion: 7, specific gravity: 7.48 $g/cm^3$) accounts for 60 vol %. They were dispersed by the vibration mill in a nitrogen atmosphere for 60 minutes to obtain an intermediate powder.

[Surface Treatment Step]

The obtained intermediate powder was introduced into pure water and stirred for 1 minute. An acid solution was introduced into the resulting slurry to effect etching. As the acid solution, a hydrochloric acid solution was used. While stirring the slurry, 50 g or more of 5% hydrochloric acid was added per 100 g of the intermediate powder. After confirming that the pH became 3 or more, decantation was performed until the electric conductivity of the slurry became 100 μS/cm or less.

[Phosphoric Acid Treatment Step]

A phosphoric acid solution was added to the obtained slurry. The phosphoric acid solution was introduced in an amount of 1 mass % in terms of $PO_4$ relative to the solid content of the particles of the second particle group. The system was stirred over 5 minutes and after solid-liquid separation, vacuum drying was performed at 120° C. for 3 hours to obtain a powder of the second particle group where a phosphoric acid-containing coating was formed.

The sintered body after pressure sintering was heated under the conditions shown in Table 2-1 and Table 2-2. In Table 2-1, the particle residual magnetization or and particle coercive force He of each of the first particle group and the second particle group are shown together. Also, in Table 2-1, the "phosphoric acid-containing coating" is denoted as "phosphoric acid coating".

Example 10

The sample of Example 10 was prepared in the same manner as in Example 9 other than a phosphoric acid-containing coating was not formed on the particle surface of the second particle group.

<<Evaluation>>

Each sample was measured for the density and magnetic properties. The density was measured by the Archimedes method. The magnetic properties were measured using a vibrating sample magnetometer (VSM). With respect to the samples of Example 1, Comparative Example 3 and Comparative Example 6, the surface of the sample was polished, and the microstructure of the polished surface was observed by means of a scanning electron microscope (SEM).

Figure 5:
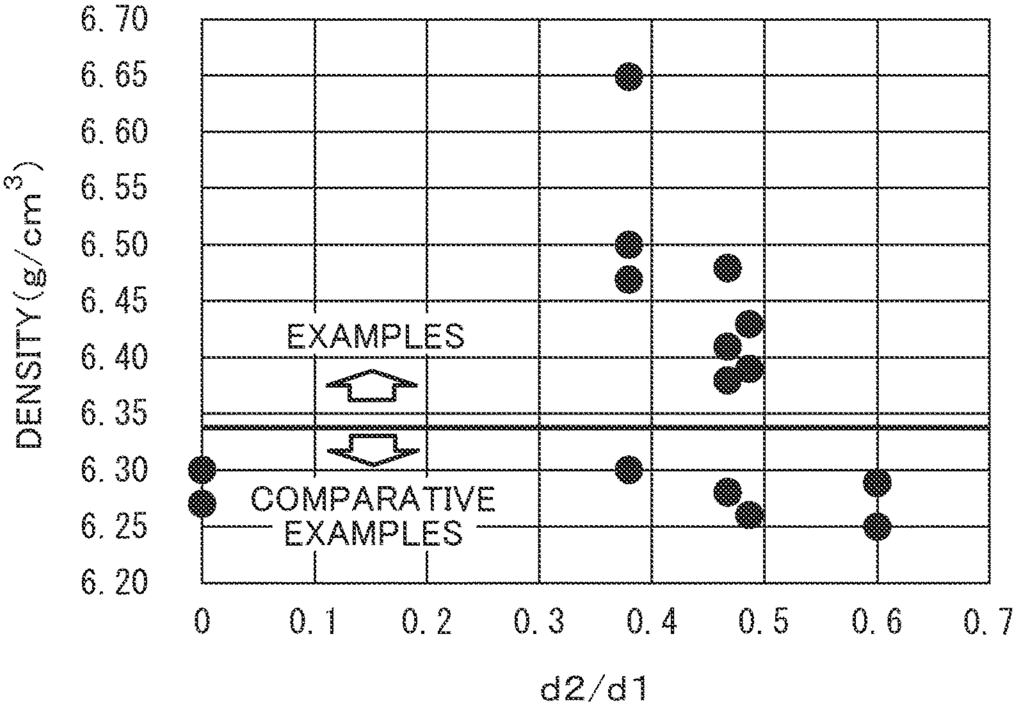
FIG. 5 is a graph illustrating the relationship between $d_2/d_1$ and the density.
Figure 6:
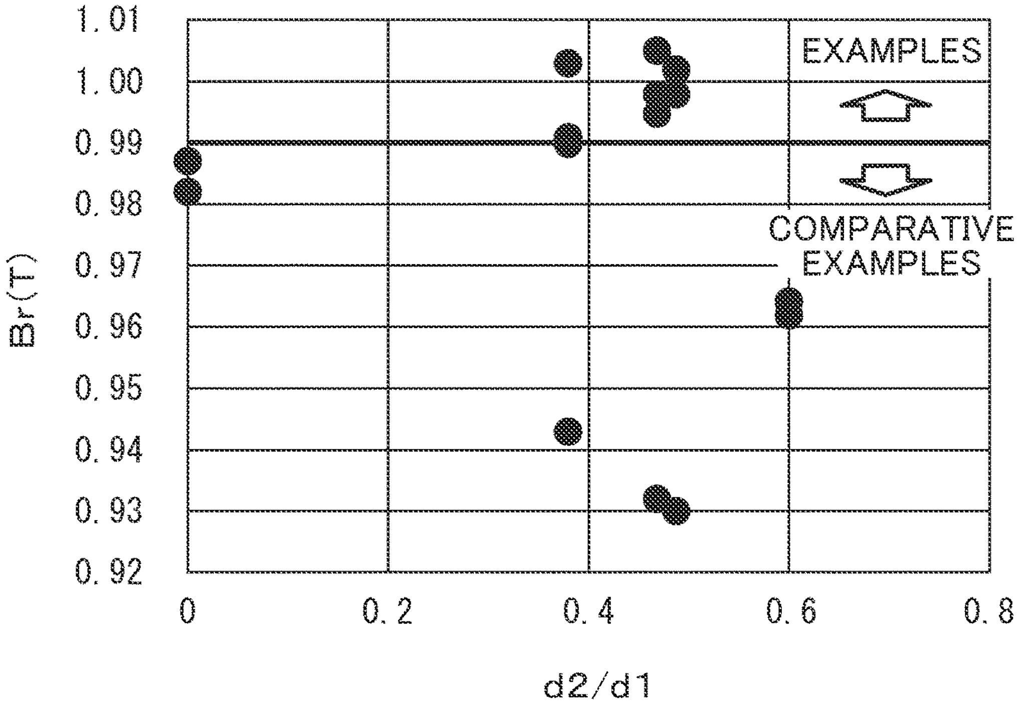
FIG. 6 is a graph illustrating the relationship between $d_2/d_1$ and the residual magnetization Br.
Figure 7:
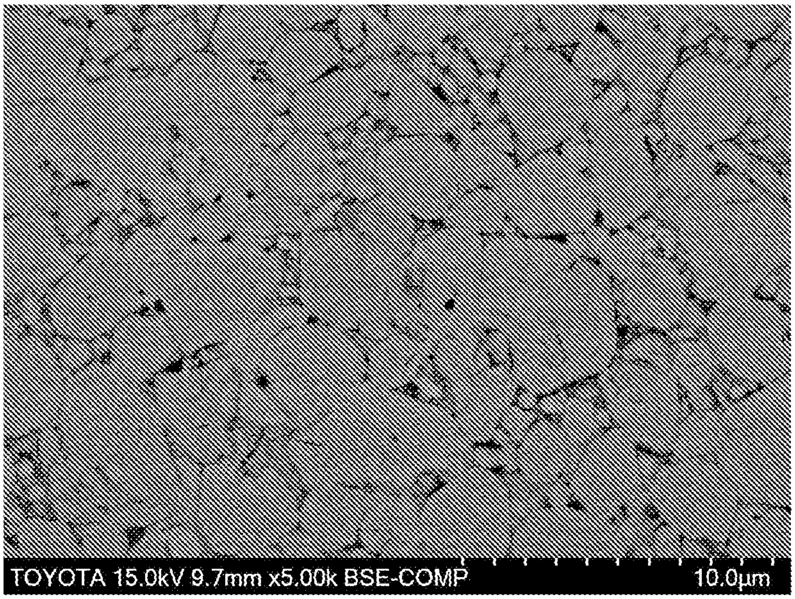
FIG. 7 is a SEM image of the sample of Example 1.
Figure 8:
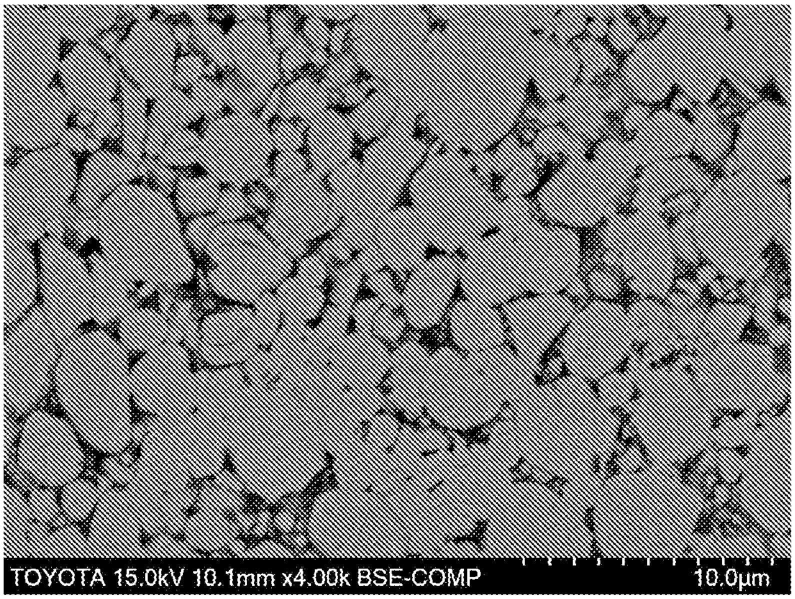
FIG. 8 is a SEM image of the sample of Comparative Example 3.
Figure 9:
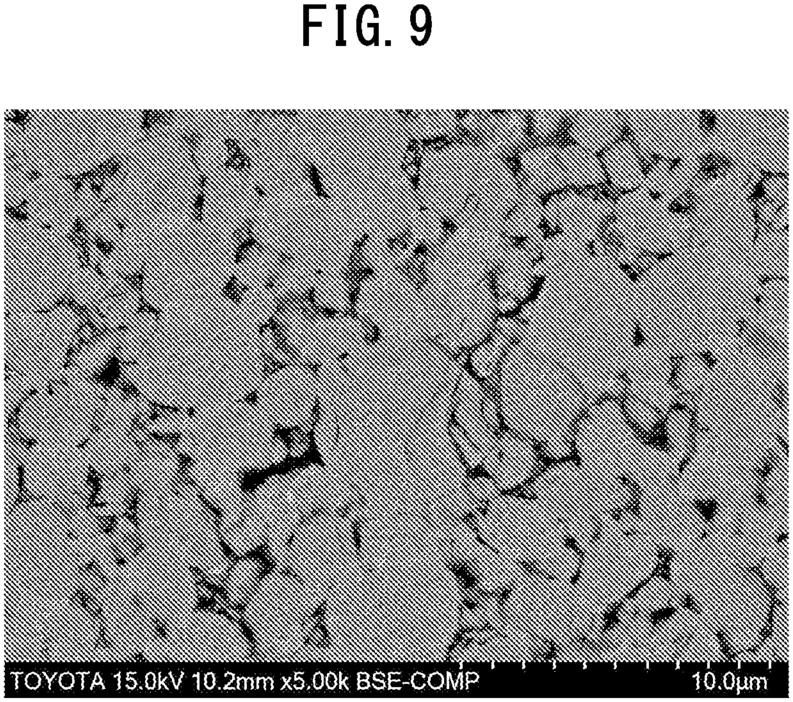
FIG. 9 is a SEM image of the sample of Comparative Example 6.

The evaluation results are shown in Tables 1-1 and 1-2, Tables 2-1 and 2-2, and FIGS. 5 to 9. FIG. 5 is a graph illustrating the relationship between $d_2/d_1$ and the density. FIG. 6 is a graph illustrating the relationship between $d_2/d_1$ and the residual magnetization Br. FIG. 7 illustrates a SEM image of the sample of Example 1. FIG. 8 illustrates a SEM image of the sample of Comparative Example 3. FIG. 9 illustrates a SEM image of the sample of Comparative Example 6.

TABLE 1-1

| | Magnetic Powder (SmFeN powder) | | | | | | Modifier Powder |
|---|---|---|---|---|---|---|---|
| | First Particle Group | | Second Particle Group | | Total Volume Ratio Between First | | Content Ratio of Zinc |
| | $d_1$ (μm) | $\sigma_r$ (A · $m^2$/kg) | $d_2$ (μm) | $\sigma_r$ (A · $m^2$/kg) | Particle Group and Second Particle Group[note)] | $d_2/d_1$ | Component (mass %) |
| Example 1 | 3.7 | 150 | 1.4 | 140 | 9:1 | 0.378 | 5 |
| Example 2 | 3.7 | 150 | 1.4 | 140 | 8:2 | 0.378 | |
| Example 3 | 3.0 | 149 | 1.4 | 140 | 9:1 | 0.467 | |
| Example 4 | 3.0 | 149 | 1.4 | 140 | 8:2 | 0.467 | |
| Example 5 | 3.7 | 150 | 1.8 | 141 | 9:1 | 0.486 | |
| Example 6 | 3.7 | 150 | 1.8 | 141 | 8:2 | 0.486 | |
| Example 7 | 3.7 | 150 | 1.4 | 140 | 9:1 | 0.378 | |
| Example 8 | 3.0 | 149 | 1.4 | 140 | 9:1 | 0.467 | |
| Comparative Example 1 | 3.0 | 149 | 1.8 | 141 | 9:1 | 0.600 | 5 |
| Comparative Example 2 | 3.0 | 149 | 1.8 | 141 | 8:2 | 0.600 | |
| Comparative Example 3 | 3.7 | 150 | 1.4 | 140 | 7:3 | 0.378 | |
| Comparative Example 4 | 3.0 | 149 | 1.4 | 140 | 7:3 | 0.467 | |
| Comparative Example 5 | 3.7 | 150 | 1.8 | 141 | 7:3 | 0.486 | |
| Comparative Example 6 | 3.7 | 150 | not used | | 10:0 | — | |
| Comparative Example 7 | 3.0 | 149 | not used | | 10:0 | — | |

Note:
total volume of first particle group:total volume of second particle group

TABLE 1-2

| | Magnetic Field Formation Conditions | | | Pressure Sintering Conditions | | | | | Properties of Rare Earth Magnet | |
|---|---|---|---|---|---|---|---|---|---|---|
| | Atmosphere | Pressure (MPa) | Application Time (min) | Heating Method | Atmosphere | Temperature (° C.) | Pressure (MPa) | Application Time (min) | Density (g/$cm^3$) | Residual Magnetization (T) |
| Example 1 | nitrogen | 50 | 1 | high frequency | argon | 380 | 1000 | 5 | 6.47 | 0.991 |
| Example 2 | | | | high frequency | | | | | 6.65 | 1.003 |
| Example 3 | | | | high frequency | | | | | 6.41 | 0.995 |
| Example 4 | | | | high frequency | | | | | 6.38 | 1.005 |
| Example 5 | | | | high frequency | | | | | 6.43 | 0.998 |
| Example 6 | | | | high frequency | | | | | 6.39 | 1.002 |
| Example 7 | | | | SPS | | | | | 6.50 | 0.990 |
| Example 8 | | | | SPS | | | | | 6.48 | 0.998 |
| Comparative Example 1 | nitrogen | 50 | 1 | high frequency | argon | 380 | 1000 | 5 | 6.29 | 0.964 |
| Comparative Example 2 | | | | high frequency | | | | | 6.25 | 0.962 |
| Comparative Example 3 | | | | high frequency | | | | | 6.30 | 0.943 |
| Comparative Example 4 | | | | high frequency | | | | | 6.28 | 0.932 |
| Comparative Example 5 | | | | high frequency | | | | | 6.26 | 0.930 |
| Comparative Example 6 | | | | high frequency | | | | | 6.27 | 0.987 |
| Comparative Example 7 | | | | high frequency | | | | | 6.30 | 0.982 |

TABLE 2-1

| | Magnetic Powder (SmFeN powder) | | | | | | | | | | Modifier |
|---|---|---|---|---|---|---|---|---|---|---|---|
| | First Particle Group | | | | Second Particle Group | | | | Total Volume Ratio Between First Particle Group and Second Particle Group[note)] | | Powder Content Ratio of Zinc Component (mass %) |
| | $d_1$ (μm) | $\sigma_r$ (A · m$^2$/kg) | $H_c$ (kA/m) | Phosphoric Acid Coating | $d_2$ (μm) | $\sigma_r$ (A · m$^2$/kg) | $H_c$ (kA/m) | Phosphoric Acid Coating | | $d_2/d_1$ | |
| Example 9 | 3.0 | 149 | 636 | none | 1.4 | 140 | 1416 | formed | 8:2 | 0.467 | 5 |
| Example 10 | 3.0 | 149 | 636 | none | 1.4 | 140 | 1416 | none | 8:2 | 0.467 | 5 |

Note:
total volume of first particle group:total volume of second particle group

TABLE 2-2

| | Magnetic Field Formation Step | | | Pressure Sintering Conditions | | | | |
|---|---|---|---|---|---|---|---|---|
| | Atmosphere | Pressure (MPa) | Application Time (min) | Heating Method | Atmosphere | Temperature (° C.) | Pressure (MPa) | Application Time (min) |
| Example 9 | nitrogen | 50 | 1 | high frequency | argon | 380 | 1000 | 5 |
| Example 10 | nitrogen | 50 | 1 | high frequency | argon | 380 | 1000 | 5 |

| | Heat Treatment Step | | | Properties of Rare Earth Magnet | | | |
|---|---|---|---|---|---|---|---|
| | Atmosphere | Temperature (° C.) | Time (hr) | Density (g/cm$^3$) | Residual Magnetization (T) | 120° C. Hk (10% demagnetization) (kA/m) | 120° C. Hc (kA/m) |
| Example 9 | vacuum $10^{-2}$ Pa | 380 | 24 | 6.43 | 1.030 | 706 | 775 |
| Example 10 | vacuum $10^{-2}$ Pa | 380 | 24 | 6.38 | 1.000 | 680 | 791 |

As shown in Table 1-1, Table 1-2 and FIGS. 5 and 6, it is understood that the samples of Examples 1 to 8 where $d_1$ and $d_2$ satisfy the predetermined relationship and the total volume of first particle group:total volume of second particle groups is in the predetermined range have a high density and in turn, exhibit excellent residual magnetization.

On the other hand, in the samples of Comparative Examples 1 and 2, although the total volume of first particle group:total volume of second particle groups is in the predetermined range, $d_2/d_1$ does not satisfy the predetermined relationship and therefore, the density is low, as a result, the residual magnetization is low. In the samples of Comparative Examples 3 to 5, although $d_2/d_1$ satisfies the predetermined relationship, the total volume of first particle group:total volume of second particle groups is not in the predetermined range and therefore, the density is low, as a result, the residual magnetization is low. Also, in the samples of Comparative Examples 6 and 7 where only the powder of the first particle group was used and the powder of the second particle group was not used, the density is low, as a result, the residual magnetization is low.

In addition, the area of dark portions (gaps) in the SEM image of the sample of Example 1 (FIG. 7) is smaller than the area of dark portions in the SEM images of the samples of Comparative Examples 3 and 6 (FIGS. 8 and 9), and it is understood from this, for example, that the density of the sample of Example 1 is higher than the density of each of the samples of Comparative Examples 3 and 6.

With respect to Examples 9 and 10, it can be understood that since $d_1$ and $d_2$ satisfy the predetermined relationship and the total volume of first particle group:total volume of second particle groups is in the predetermined range, the density is high and in turn, the residual magnetization is excellent. Also, in Example 9, a phosphoric acid-containing coating was formed on the particle surface of the second particle group, whereas in Example 10, a phosphoric acid-containing coating was not formed on the particle surface of the second particle group. Consequently, it can be understood that compared with the sample of Example 10, in the sample of Example 9, the Hk at 120° C. is large and the squareness at high temperatures is excellent.

From these results, the effects of the production method of a rare earth magnet of the present disclosure and the rare earth magnet obtained by the method could be confirmed.

REFERENCE SIGNS LIST

10 SmFeN Powder particles (magnetic particles)
11 First particle group
12 Second particle group
20 Modifier

30 Modified phase

100 Rare earth magnet obtained by the production method of the present disclosure

200 Rare earth magnet obtained by the conventional production method

The invention claimed is:

1. A method for producing a rare earth magnet, comprising:

preparing a magnetic powder having a magnetic phase which contains Sm, Fe and N and at least partially has either a $Th_2Zn_{17}$ or $Th_2Ni_{17}$ crystal structure, preparing a modifier powder containing at least either a metallic zinc or a zinc alloy, mixing the magnetic powder and the modifier powder to obtain a mixed powder, compression-molding the mixed powder in a magnetic field to obtain a magnetic-field molded body, and pressure-sintering the magnetic-field molded body to obtain a sintered body, wherein the magnetic powder includes a first particle group and a second particle group, the particle size distribution $D_{50}$ of the first particle group and the particle size distribution $D_{50}$ of the second particle group are denoted by $d_1$ μm and $d_2$ μm, respectively, $d_1$ and $d_2$ satisfy the relationship of $0.350 \leq d_2/d_1 \leq 0.500$, the ratio between the total volume of the first particle group and the total volume of the second particle group, which is total volume of first particle group: total volume of second particle group, is from 9:1 to 4:1, and $d_1$ is from 3.0 to 3.7 μm and $d_2$ is from 1.4 to 1.8 μm.

2. The production method of a rare earth magnet according to claim 1, wherein $D_{50}$ of the modifier powder is from 0.1 to 12.0 μm and the content ratio of the zinc component in the modifier powder is from 1 to 30 mass % relative to the mixed powder.

3. The production method of a rare earth magnet according to claim 1, wherein the mixed powder is compression-molded at a pressure of 10 to 1,500 MPa.

4. The production method of a rare earth magnet according to claim 1, wherein the magnetic-field molded body is pressure-sintered at a pressure of 100 to 2,000 MPa and a temperature of 300 to 430° C. over 1 to 30 minutes.

5. The production method of a rare earth magnet according to claim 1, further comprising, before the pressure-sintering, previously forming a phosphoric acid coating on the particle surface of the second particle group, and heat-treating the sintered body to allow the progress of modification of the particle surface of the first particle group.

6. The production method of a rare earth magnet according to claim 5, wherein the sintered body is heat-treated at 350 to 410° C.

* * * * *